(12) United States Patent
Tsai et al.

(10) Patent No.: US 10,459,194 B2
(45) Date of Patent: Oct. 29, 2019

(54) FOUR-PIECE INFRARED SINGLE WAVELENGTH PROJECTION LENS SYSTEM

(71) Applicant: NEWMAX TECHNOLOGY CO., LTD., Tai-Chung (TW)

(72) Inventors: Fei-Hsin Tsai, Tai-Chung (TW); Ching-Yun Huang, Tai-Chung (TW)

(73) Assignee: NEWMAX TECHNOLOGY CO., LTD., Tai-Chung (TW)

( * ) Notice: Subject to any disclaimer, the term of this patent is extended or adjusted under 35 U.S.C. 154(b) by 0 days.

(21) Appl. No.: 15/936,411

(22) Filed: Mar. 26, 2018

(65) Prior Publication Data

US 2019/0293904 A1    Sep. 26, 2019

(51) Int. Cl.
| | | |
|---|---|---|
| *G02B 13/14* | (2006.01) | |
| *G02B 9/34* | (2006.01) | |
| *G02B 13/06* | (2006.01) | |
| *G02B 27/09* | (2006.01) | |
| *G02B 13/00* | (2006.01) | |

(52) U.S. Cl.
CPC ............ *G02B 9/34* (2013.01); *G02B 13/008* (2013.01); *G02B 13/06* (2013.01); *G02B 13/14* (2013.01); *G02B 27/0955* (2013.01)

(58) Field of Classification Search
CPC .............................. G02B 13/008; G02B 13/14
USPC .................................................. 359/350, 357
See application file for complete search history.

(56) References Cited

U.S. PATENT DOCUMENTS

2019/0137734 A1*    5/2019    Gong ...................... G02B 9/36

* cited by examiner

*Primary Examiner* — Darryl J Collins
(74) *Attorney, Agent, or Firm* — Bruce Stone LLP; Joseph Bruce

(57) ABSTRACT

A four-piece infrared single wavelength projection lens system in accordance with the present invention comprises, in order from an image side to an image source side: a stop; a first lens element with a positive refractive power having an image-side surface being convex near an optical axis, the first lens element is made of glass material; a second lens element with a refractive power having an image-side surface being convex near the optical axis and an image source-side surface being concave near the optical axis; a third lens element with a negative refractive power having an image-side surface being concave near the optical axis and an image source-side surface being concave near the optical axis; and a fourth lens element with a positive refractive power having an image-side surface being concave near the optical axis and an image source-side surface being convex near the optical axis.

17 Claims, 14 Drawing Sheets

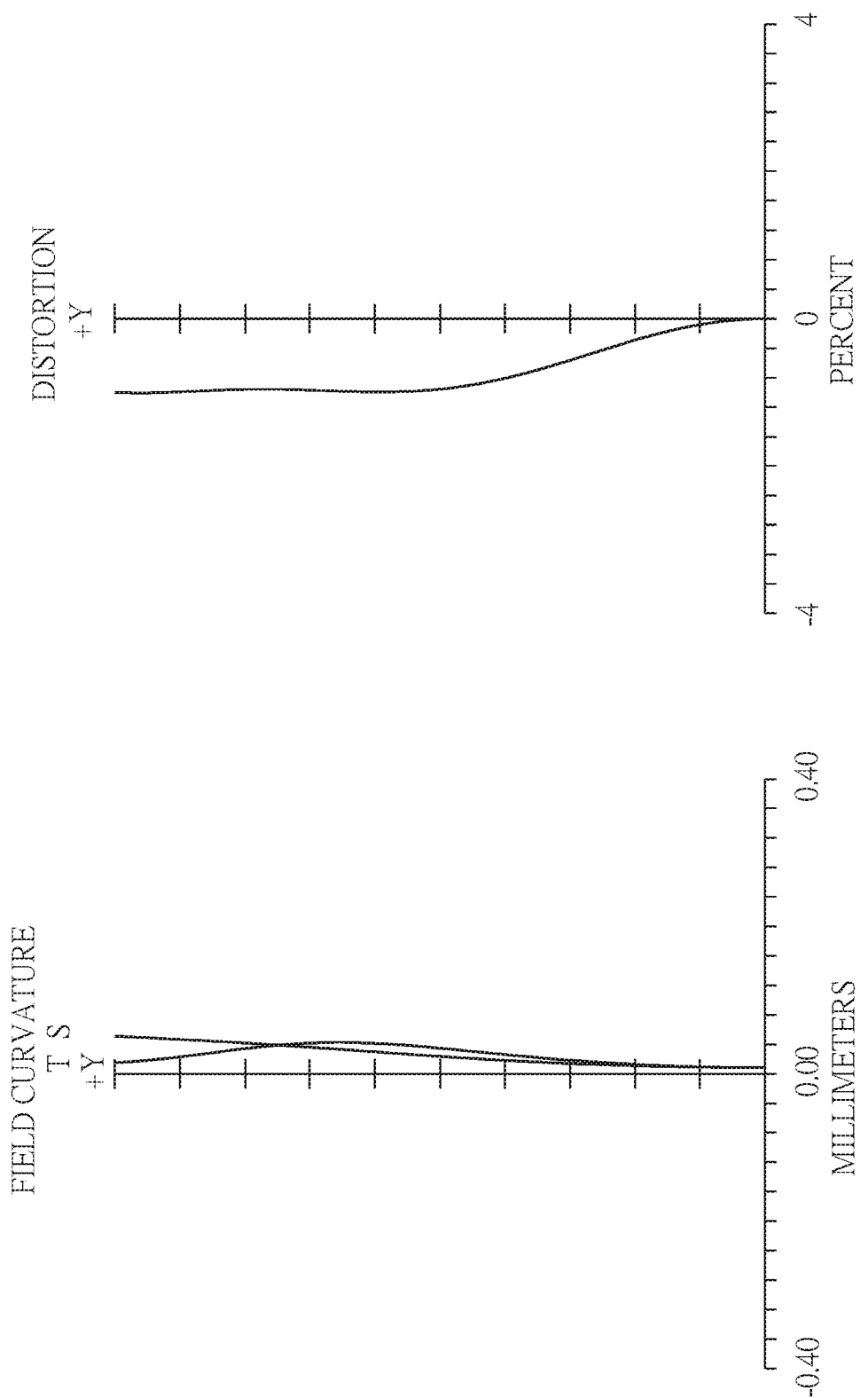

FOUR-PIECE INFRARED SINGLE WAVELENGTH PROJECTION LENS SYSTEM

BACKGROUND

Field of the Invention

The present invention relates to a lens system, and more particularly to a miniaturized four-piece infrared single wavelength projection lens system applicable to electronic products.

Description of the Prior Art

Nowadays digital imaging technology is constantly innovating and changing, in particular, digital carriers, such as, digital camera and mobile phone and so on, have become smaller in size, so CCD (Charge Coupled Device) or CMOS (Complementary Metal Oxide Semiconductor) sensor is also required to be more compact. In addition to be used in the field of photography, in recent years, infrared focusing lens has also be used in infrared receiving and sensing field of the game machine, and in order to make the scope of game machine induction user more broader, wide-angle lens group has become the mainstream for receiving infrared wavelength at present.

The applicant has also put forward a number of lens groups related to infrared wavelength reception, however, at present, the game machine is based on a more three-dimensional, real and immediate 3D game, the current or the applicant's previous lens groups are all 2D plane games, which cannot meet the 3D game focusing on the deep induction efficacy.

Special infrared receiving and induction lens groups for game machines are made of plastic for the pursuit of low cost, however, poor material transparency is one of the key factors that affect the depth detection accuracy of the game machine, and plastic lenses are easy to overheat or too cold in ambient temperature, so that the focal length of the lens group will be changed and cannot focus accurately. Therefore, the current infrared receiving and induction lens groups cannot meet the 3D game depth precise induction requirement.

The present invention mitigates and/or obviates the aforementioned disadvantages.

SUMMARY

The primary objective of the present invention is to provide a four-piece infrared single wavelength projection lens system which has a larger focal length, high resolution, short length and less distortion.

Therefore, a four-piece infrared single wavelength projection lens system in accordance with the present invention comprises, in order from an image side to an image source side: a stop; a first lens element with a positive refractive power having an image-side surface being convex near an optical axis, at least one of the image-side surface and an image source-side surface of the first lens element being aspheric, the first lens element is made of glass material; a second lens element with a refractive power having an image-side surface being convex near the optical axis and an image source-side surface being concave near the optical axis, at least one of the image-side surface and the image source-side surface of the second lens element being aspheric; a third lens element with a negative refractive power having an image-side surface being concave near the optical axis and an image source-side surface being concave near the optical axis, at least one of the image-side surface and the image source-side surface of the third lens element being aspheric; and a fourth lens element with a positive refractive power having an image-side surface being concave near the optical axis and an image source-side surface being convex near the optical axis, at least one of the image-side surface and the image source-side surface of the fourth lens element being aspheric.

The first lens element is placed on the side nearest to the object and is most easily damaged by external factors, therefore, the first lens element can not be made of easily damaged plastic material, but made of glass material, which can reduce the formation of cracks of the first lens element, while the first lens element can protect the other lens elements formed by plastic materials. At the same time, the first lens element is made of glass material, so its refractive index will hardly change with the temperature.

Preferably, a focal length of the four-piece infrared single wavelength projection lens system is f, a focal length of the first lens element is f1, and they satisfy the relation: $1.0<f/f1<4.0$, so that the refractive power of the first lens element is more suitable, which can avoid the excessive increase of sensitivity.

Preferably, the focal length of the four-piece infrared single wavelength projection lens system is f, a focal length of the second lens element, the third lens element and the fourth lens element combined is f234, and they satisfy the relation: $0.35<f/f234<1.2$, so that the changes in the position of the image points in the whole four-piece infrared single wavelength projection lens system can be suppressed to a very low degree by the change of temperature.

Preferably, the focal length of the first lens element is f1, a focal length of the second lens element is f2, and they satisfy the relation: $-0.81<f1/f2<1.1$, so that the refractive power of the first lens element and the second lens element are more suitable, it will be favorable to avoid the excessive increase of aberration of the system.

Preferably, the focal length of the second lens element is f2, a focal length of the third lens element is f3, and they satisfy the relation: $-72.3<f2/f3<5.6$, which can improve the peripheral resolution and illuminance of the system.

Preferably, the focal length of the third lens element is f3, a focal length of the fourth lens element is f4, and they satisfy the relation: $-0.67<f3/f4<-0.20$, so that the refractive power of the system can be balanced effectively, it will be favorable to reduce the sensitivity of the system, improving the yield of production.

Preferably, the focal length of the first lens element is f1, the focal length of the third lens element is f3, and they satisfy the relation: $-4.9<f1/f3<-1.6$, so that the positive refractive power of the first lens element can be distributed effectively, so as to reduce the sensitivity of the four-piece infrared single wavelength projection lens system.

Preferably, the focal length of the second lens element is f2, the focal length of the fourth lens element is f4, and they satisfy the relation: $-2.5<f2/f4<29.8$, so that the distribution of the refractive power will be appropriate, it will be favorable to correct the aberration of the system and improve the image quality.

Preferably, the focal length of the first lens element is f1, a focal length of the second lens element and the third lens element combined is f23, and they satisfy the relation: $-4.1<f1/f23<-1.4$. If f1/f23 satisfies the above relation, the resolution can be improved evidently.

Preferably, a focal length of the first lens element and the second lens element combined is f12, a focal length of the third lens element and the fourth lens element combined is f34, and they satisfy the relation: 0.05<f12/f34<0.79, which can effectively correct image distortion.

Preferably, the focal length of the first lens element is f1, a focal length of the second lens element, the third lens element and the fourth lens element combined is f234, and they satisfy the relation: 0.07<f1/f234<0.62, which can effectively improve the focal length.

Preferably, a focal length of the first lens element, the second lens element and the third lens element combined is f123, the focal length of the fourth lens element is f4, and they satisfy the relation: 2.8<f123/f4<5.3. Appropriate refractive power is favorable to reduce the spherical aberration and astigmatism of the system effectively.

Preferably, a radius of curvature of the image-side surface of the first lens element is R1, a radius of curvature of the image source-side surface of the first lens element is R2, and they satisfy the relation: −0.9<R1/R2<0.9, which can effectively improve the combined focal length of the four-piece infrared single wavelength projection lens system.

Preferably, a radius of curvature of the image-side surface of the second lens element is R3, a radius of curvature of the image source-side surface of the second lens element is R4, and they satisfy the relation: 0.1<R3/R4<3.6, which can reduce the spherical aberration and astigmatism of the four-piece infrared single wavelength projection lens system.

Preferably, a radius of curvature of the image-side surface of the third lens element is R5, a radius of curvature of the image source-side surface of the third lens element is R6, and they satisfy the relation: −3.9<R5/R6<−0.6, which can reduce the spherical aberration and astigmatism of the four-piece infrared single wavelength projection lens system.

Preferably, a radius of curvature of the image-side surface of the fourth lens element is R7, a radius of curvature of the image source-side surface of the fourth lens element is R8, and they satisfy the relation: 3.5<R7/R8<29.2, which can reduce the spherical aberration and astigmatism of the four-piece infrared single wavelength projection lens system.

Preferably, the focal length of the four-piece infrared single wavelength projection lens system is f, a distance from the image-side surface of the first lens element to the image source-side surface along the optical axis is TL, and they satisfy the relation: 1.0<f/TL<1.67, it will be favorable to maintain the objective of miniaturization and larger focal length of the four-piece infrared single wavelength projection lens system, which can be used in thin electronic products.

Preferably, a refractive index of the first lens element is n1, a refractive index of the second lens element is n2, a refractive index of the third lens element is n3, a refractive index of the fourth lens element is n4, and they satisfy the relations: n1>1.6, n2>1.6, n3>1.6 and n4>1.6, it will be favorable to permeate the four-piece infrared single wavelength projection lens system, so as to reduce the absorptivity of infrared single wavelength in the lens system.

The present invention will be presented in further details from the following descriptions with the accompanying drawings, which show, for purpose of illustrations only, the preferred embodiments in accordance with the present invention.

BRIEF DESCRIPTION OF THE DRAWINGS

FIG. 7B shows the image plane curve and the distortion curve of the seventh embodiment of the present invention

DETAILED DESCRIPTION

Figure 1A:
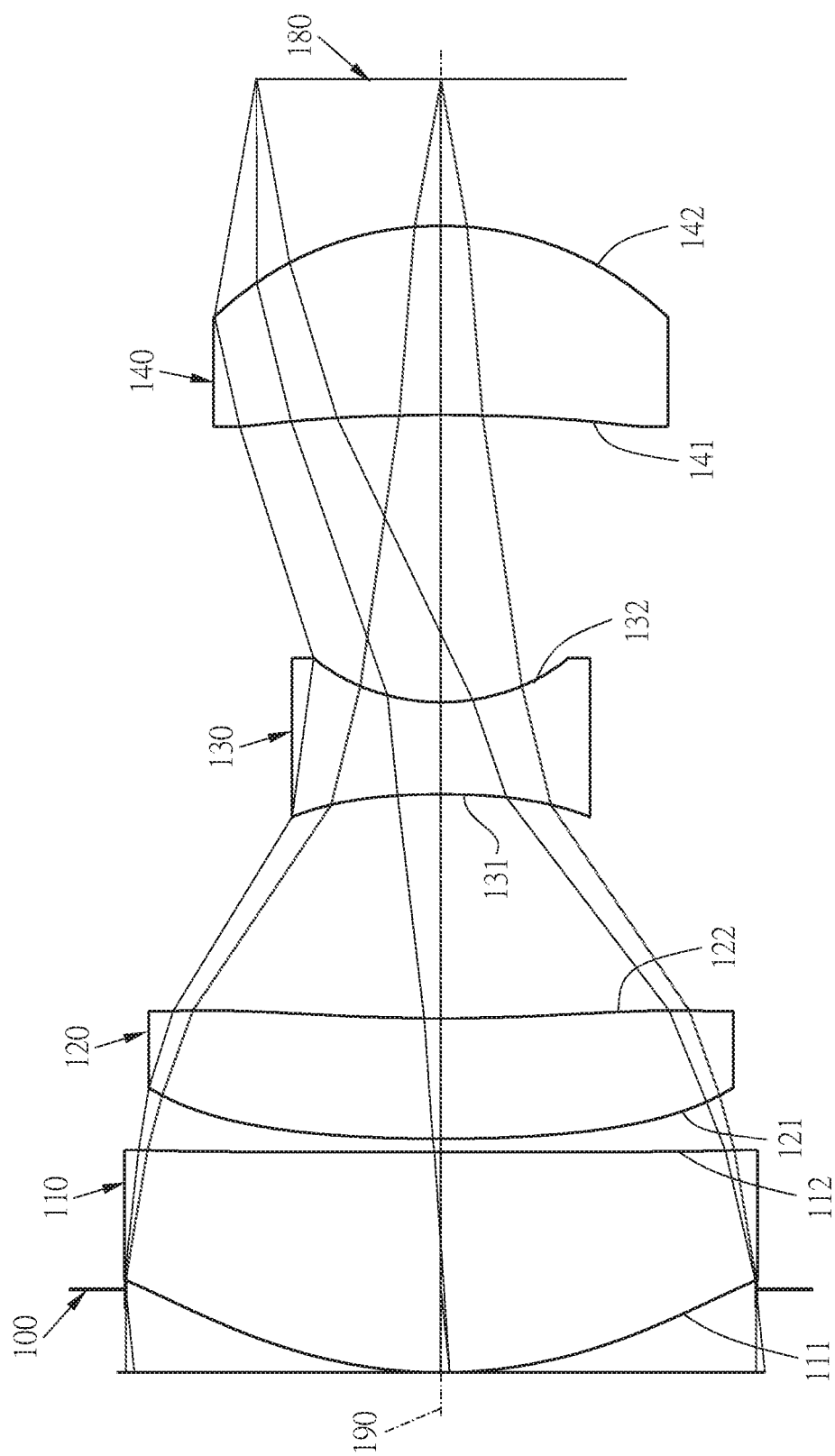
FIG. 1A shows a four-piece infrared single wavelength projection lens system in accordance with a first embodiment of the present invention.
Figure 1B:
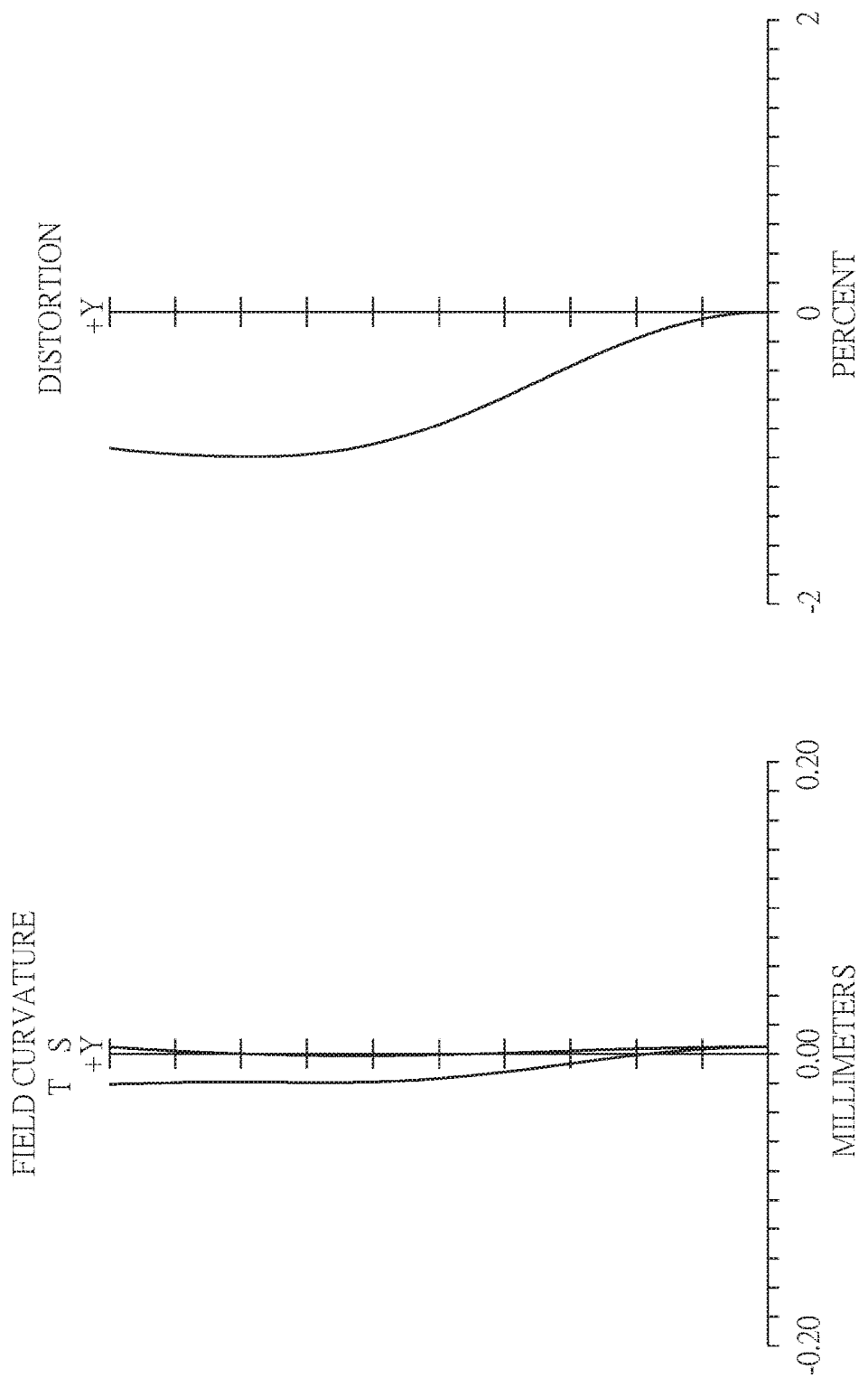
FIG. 1B shows the image plane curve and the distortion curve of the first embodiment of the present invention.

Referring to FIGS. 1A and 1B, FIG. 1A shows a four-piece infrared single wavelength projection lens system in accordance with a first embodiment of the present invention, and FIG. 1B shows, in order from left to right, the image plane curve and the distortion curve of the first embodiment of the present invention. A four-piece infrared single wavelength projection lens system in accordance with the first embodiment of the present invention comprises a stop 100 and a lens group. The lens group comprises, in order from an image side to an image source side: a first lens element 110, a second lens element 120, a third lens element 130, a fourth lens element 140 and an image source plane 180, wherein the four-piece infrared single wavelength projection lens system has a total of four lens elements with refractive power. The stop 100 is disposed between an image-side surface 111 and an image source-side surface 112 of the first lens element 110.

The first lens element 110 with a positive refractive power has the image-side surface 111 being convex near an optical axis 190 and the image source-side surface 112 being convex near the optical axis 190, the image-side surface 111 and the image source-side surface 112 are aspheric, and the first lens element 110 is made of glass.

The second lens element 120 with a positive refractive power has an image-side surface 121 being convex near the optical axis 190 and an image source-side surface 122 being concave near the optical axis 190, the image-side surface 121 and the image source-side surface 122 are aspheric, and the second lens element 120 is made of plastic material.

The third lens element 130 with a negative refractive power has an image-side surface 131 being concave near the optical axis 190 and an image source-side surface 132 being concave near the optical axis 190, the image-side surface 131 and the image source-side surface 132 are aspheric, and the third lens element 130 is made of plastic material.

The fourth lens element 140 with a positive refractive power has an image-side surface 141 being concave near the optical axis 190 and an image source-side surface 142 being convex near the optical axis 190, the image-side surface 141 and the image source-side surface 142 are aspheric, and the fourth lens element 140 is made of plastic material.

The equation for the aspheric surface profiles of the respective lens elements of the first embodiment is expressed as follows:

$$z = \frac{ch^2}{1+[1-(k+1)c^2h^2]^{0.5}} + Ah^4 + Bh^6 + Ch^8 + Dh^{10} + Eh^{12} + Gh^{14} + ...$$

wherein:

z represents the value of a reference position with respect to a vertex of the surface of a lens and a position with a height h along the optical axis 190;

c represents a paraxial curvature equal to 1/R (R: a paraxial radius of curvature);

h represents a vertical distance from the point on the curve of the aspheric surface to the optical axis 190;

k represents the conic constant;

A、B、C、D、E、G、. . . : represent the high-order aspheric coefficients.

In the first embodiment of the present four-piece infrared single wavelength projection lens system, a focal length of the four-piece infrared single wavelength projection lens system is f, a f-number of the four-piece infrared single wavelength projection lens system is Fno, the four-piece infrared single wavelength projection lens system has a maximum view angle (field of view) FOV, and they satisfy the relations: f=4.80 mm; Fno=2.8; and FOV=12.0 degrees.

In the first embodiment of the present four-piece infrared single wavelength projection lens system, the focal length of the four-piece infrared single wavelength projection lens system is f, a focal length of the first lens element 110 is f1, and they satisfy the relation: f/f1=2.52.

In the first embodiment of the present four-piece infrared single wavelength projection lens system, the focal length of the four-piece infrared single wavelength projection lens system is f, a focal length of the second lens element 120, the third lens element 130 and the fourth lens element 140 combined is f234, and they satisfy the relation: f/f234=0.57.

In the first embodiment of the present four-piece infrared single wavelength projection lens system, the focal length of the first lens element 110 is f1, a focal length of the second lens element 120 is f2, and they satisfy the relation: f1/f2=0.04.

In the first embodiment of the present four-piece infrared single wavelength projection lens system, the focal length of the second lens element 120 is f2, a focal length of the third lens element 130 is f3, and they satisfy the relation: f2/f3=−71.82.

In the first embodiment of the present four-piece infrared single wavelength projection lens system, the focal length of the third lens element 130 is f3, a focal length of the fourth lens element 140 is f4, and they satisfy the relation: f3/f4=−0.40.

In the first embodiment of the present four-piece infrared single wavelength projection lens system, the focal length of the first lens element 110 is f1, the focal length of the third lens element 130 is f3, and they satisfy the relation: f1/f3=−2.74.

In the first embodiment of the present four-piece infrared single wavelength projection lens system, the focal length of the second lens element 120 is f2, the focal length of the fourth lens element 140 is f4, and they satisfy the relation: f2/f4=28.75.

In the first embodiment of the present four-piece infrared single wavelength projection lens system, the focal length of the first lens element 110 is f1, a focal length of the second lens element 120 and the third lens element 130 combined is f23, and they satisfy the relation: f1/f23=−2.58.

In the first embodiment of the present four-piece infrared single wavelength projection lens system, a focal length of the first lens element 110 and the second lens element 120 combined is f12, a focal length of the third lens element 130 and the fourth lens element 140 combined is f34, and they satisfy the relation: f12/f34=0.21.

In the first embodiment of the present four-piece infrared single wavelength projection lens system, the focal length of the four-piece infrared single wavelength projection lens system is f, the focal length of the second lens element 120, the third lens element 130 and the fourth lens element 140 combined is f234, and they satisfy the relation: f1/f234=0.23.

In the first embodiment of the present four-piece infrared single wavelength projection lens system, a focal length of the first lens element 110, the second lens element 120 and the third lens element 130 combined is f123, the focal length of the fourth lens element 140 is f4, and they satisfy the relation: f123/f4=3.34.

In the first embodiment of the present four-piece infrared single wavelength projection lens system, a radius of curvature of the image-side surface 111 of the first lens element 110 is R1, a radius of curvature of the image source-side surface 112 of the first lens element 110 is R2, and they satisfy the relation: R1/R2=−0.01.

In the first embodiment of the present four-piece infrared single wavelength projection lens system, a radius of curvature of the image-side surface 121 of the second lens element 120 is R3, a radius of curvature of the image source-side surface 122 of the second lens element 120 is R4, and they satisfy the relation: R3/R4=0.89.

In the first embodiment of the present four-piece infrared single wavelength projection lens system, a radius of curvature of the image-side surface 131 of the third lens element 130 is R5, a radius of curvature of the image source-side surface 132 of the third lens element 130 is R4, and they satisfy the relation: R5/R6=−3.57.

In the first embodiment of the present four-piece infrared single wavelength projection lens system, a radius of curvature of the image-side surface 141 of the fourth lens element 140 is R7, a radius of curvature of the image source-side surface 142 of the fourth lens element 140 is R8, and they satisfy the relation: R7/R8=5.65.

In the first embodiment of the present four-piece infrared single wavelength projection lens system, the focal length of the four-piece infrared single wavelength projection lens system is f, a distance from the object-side surface 111 of the first lens element 110 to the image source-side surface 112 along the optical axis 190 is TL, and they satisfy the relation: f/TL=1.37.

In the first embodiment of the present four-piece infrared single wavelength projection lens system, a refractive index of the first lens element 110 is n1, a refractive index of the second lens element 120 is n2, a refractive index of the third lens element 130 is n3, a refractive index of the fourth lens element 140 is n4, and they satisfy the relations: n1=1.694, n2=1.636, n3=1.636 and n4=1.636.

The detailed optical data of the first embodiment is shown in table 1, and the aspheric surface data is shown in table 2.

TABLE 1

Embodiment 1
F(focal length) = 4.80 mm, Fno = 2.8, FOV = 12.0 deg.

| surface | | Curvature Radius | Thickness | Material | Index | Abbe # | Focal length |
|---|---|---|---|---|---|---|---|
| 0 | object | plane | 700 | | | | |
| 1 | | plane | 0.226 | | | | |
| 2 | stop | plane | −0.226 | | | | |
| 3 | Lens 1 | 1.314 (ASP) | 0.598 | glass | 1.694 | 53.2 | 1.91 |
| 4 | | −97.791 (ASP) | 0.036 | | | | |
| 5 | Lens 2 | 4.263 (ASP) | 0.327 | plastic | 1.636 | 24.0 | 49.98 |
| 6 | | 4.808 (ASP) | 0.608 | | | | |
| 7 | Lens 3 | −2.030 (ASP) | 0.250 | plastic | 1.636 | 24.0 | −0.70 |
| 8 | | 0.568 (ASP) | 0.779 | | | | |
| 9 | Lens 4 | −5.179 (ASP) | 0.513 | plastic | 1.636 | 24.0 | 1.74 |
| 10 | | −0.917 (ASP) | 0.398 | | | | |
| 11 | Image source plane | plane | | | | | |

TABLE 2

Aspheric Coefficients

| surface | 3 | 4 | 5 | 6 |
|---|---|---|---|---|
| K: | −8.4403E−01 | −3.2622E+02 | 1.6912E+01 | −7.3427E+01 |
| A: | −1.0677E−02 | 2.6010E−02 | 4.7586E−02 | −4.7110E−02 |
| B: | −1.8032E−02 | −1.4891E−02 | 9.4453E−02 | −9.2715E−02 |
| C: | −7.6615E−02 | 1.9209E−02 | 6.0812E−02 | 5.9737E−02 |
| D: | 1.3092E−02 | −1.5576E−02 | 1.1717E−02 | 3.4487E−02 |
| E: | | | 2.2304E−03 | −4.0669E−02 |
| F: | | | −1.3020E−01 | −6.1812E−02 |

| surface | 7 | 8 | 9 | 10 |
|---|---|---|---|---|
| K: | 1.9126E+01 | −3.0145E+00 | 5.5651E+01 | −8.6108E−01 |
| A: | −6.7094E−01 | 1.5973E+00 | 7.9115E−02 | −3.2845E−01 |
| B: | 2.2042E+00 | 8.3575E+00 | −1.0659E+00 | 5.6358E−01 |
| C: | 1.1020E+00 | −8.4614E+01 | 4.2545E+00 | −2.1332E+00 |
| D: | −4.6783E+01 | 2.2472E+02 | −4.5758E+00 | 2.8358E+00 |
| E: | 3.5677E+02 | 4.5970E+03 | 2.2936E+00 | 7.7635E−01 |
| F: | −1.4430E+02 | −2.7594E+04 | 1.6728E+00 | −1.7925E+00 |

The units of the radius of curvature, the thickness and the focal length in table 1 are expressed in mm, the surface numbers 0-11 represent the surfaces sequentially arranged from the image-side to the image source-side along the optical axis. In table 2, k represents the conic coefficient of the equation of the aspheric surface profiles, and A、B、C、D、E、F、G、H . . . : represent the high-order aspheric coefficients. The tables presented below for each embodiment are the corresponding schematic parameter, aberration curves, and the definitions of the tables are the same as Table 1 and Table 2 of the first embodiment. Therefore, an explanation in this regard will not be provided again.

Figure 2A:
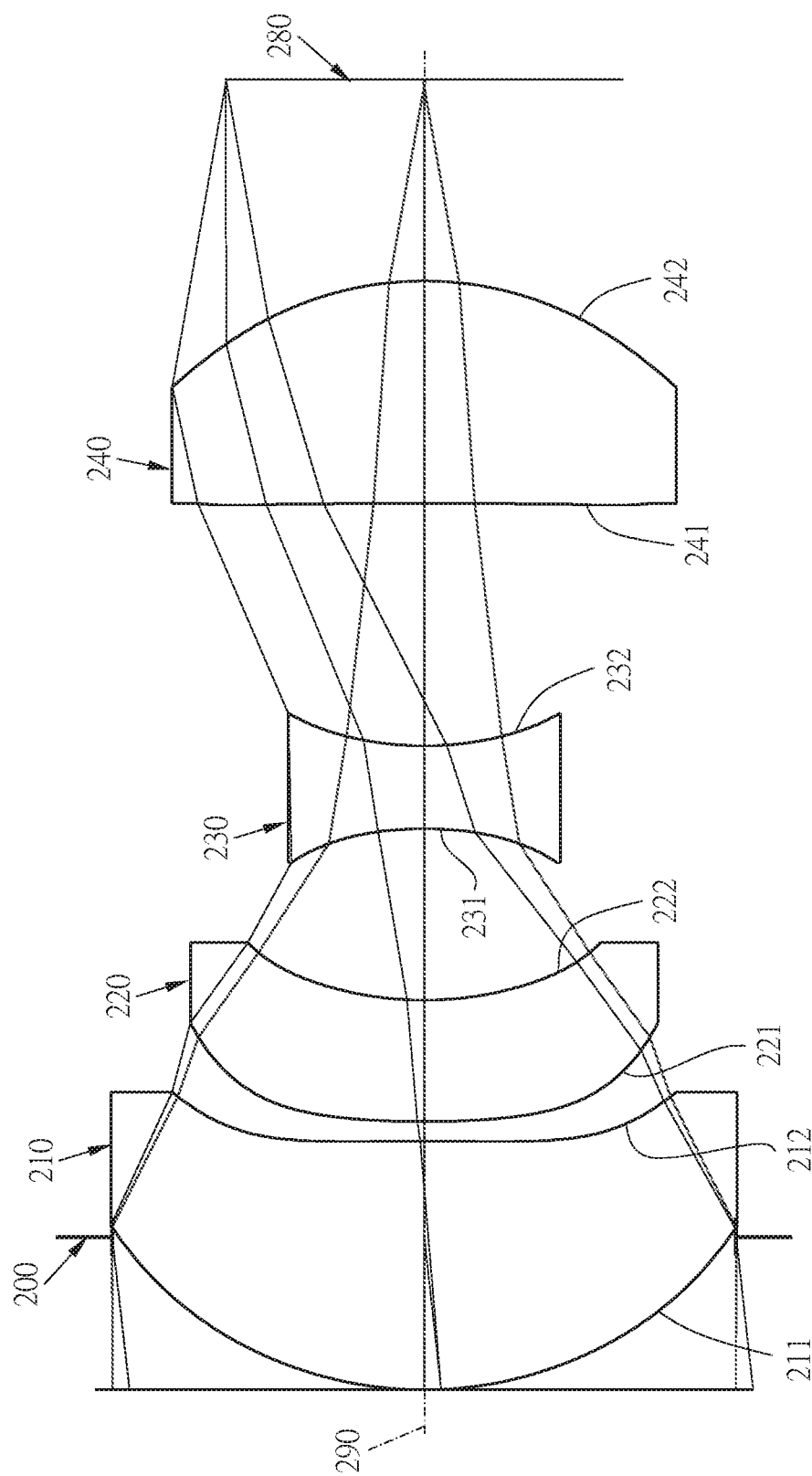
FIG. 2A shows a four-piece infrared single wavelength projection lens system in accordance with a second embodiment of the present invention.
Figure 2B:
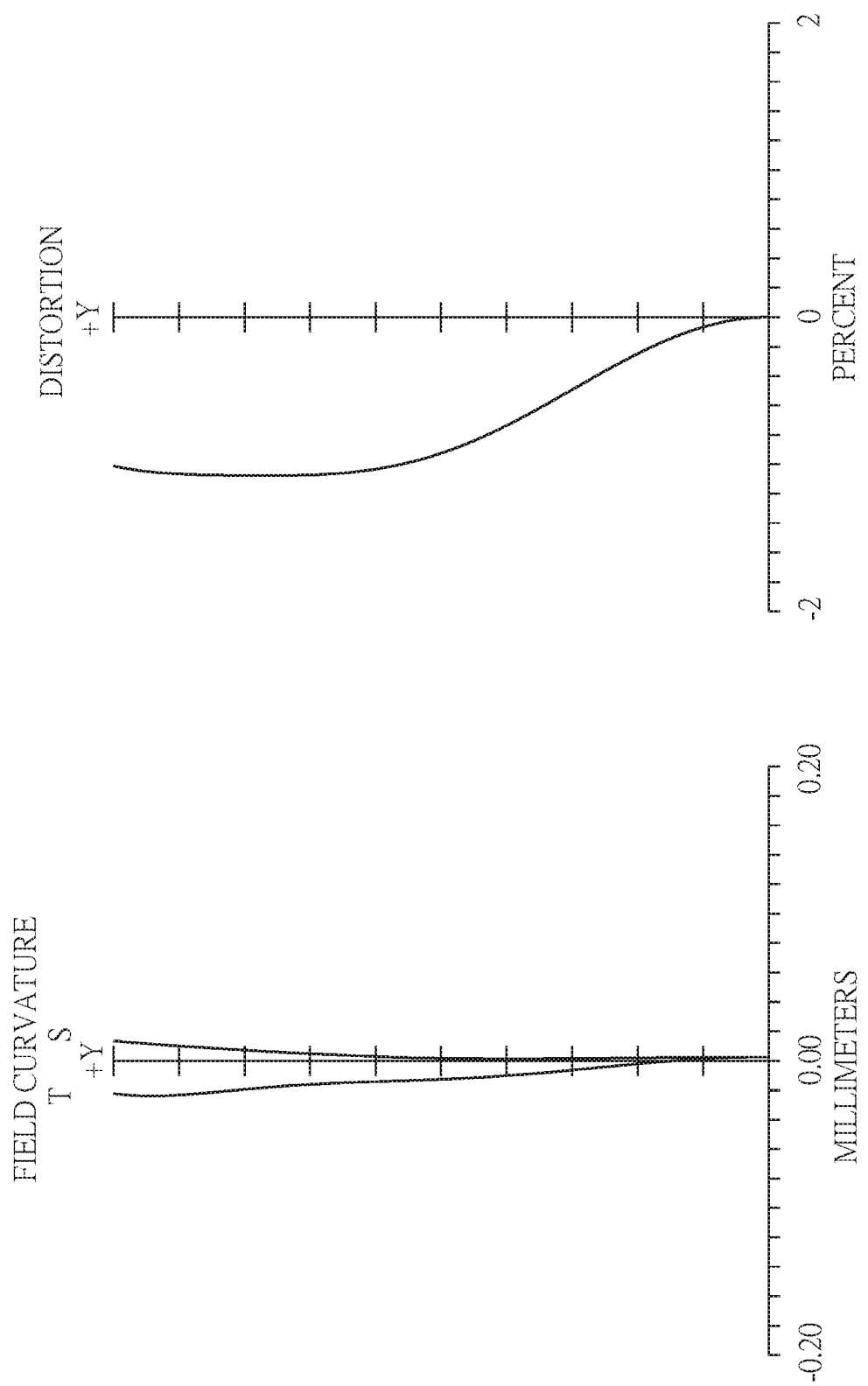
FIG. 2B shows the image plane curve and the distortion curve of the second embodiment of the present invention.

Referring to FIGS. 2A and 2B, FIG. 2A shows a four-piece infrared single wavelength projection lens system in accordance with a second embodiment of the present invention, and FIG. 2B shows, in order from left to right, the image plane curve and the distortion curve of the second embodiment of the present invention. A four-piece infrared single wavelength projection lens system in accordance with the second embodiment of the present invention comprises a stop 200 and a lens group. The lens group comprises, in order from an image side to an image source side: a first lens element 210, a second lens element 220, a third lens element 230, a fourth lens element 240 and an image source plane 280, wherein the four-piece infrared single wavelength projection lens system has a total of four lens elements with refractive power. The stop 200 is disposed between an image-side surface 211 and an image source-side surface 212 of the first lens element 210.

The first lens element 210 with a positive refractive power has the image-side surface 211 being convex near an optical axis 290 and the image source-side surface 212 being convex near the optical axis 290, the image-side surface 211 and the image source-side surface 212 are aspheric, and the first lens element 210 is made of glass.

The second lens element 220 with a negative refractive power has an image-side surface 221 being convex near the optical axis 290 and an image source-side surface 222 being concave near the optical axis 290, the image-side surface 221 and the image source-side surface 222 are aspheric, and the second lens element 220 is made of plastic material.

The third lens element 230 with a negative refractive power has an image-side surface 231 being concave near the optical axis 290 and an image source-side surface 232 being concave near the optical axis 290, the image-side surface 231 and the image source-side surface 232 are aspheric, and the third lens element 230 is made of plastic material.

The fourth lens element 240 with a positive refractive power has an image-side surface 241 being concave near the optical axis 290 and an image source-side surface 242 being convex near the optical axis 290, the image-side surface 241 and the image source-side surface 242 are aspheric, and the fourth lens element 240 is made of plastic material.

The detailed optical data of the second embodiment is shown in table 3, and the aspheric surface data is shown in table 4.

TABLE 3

Embodiment 2
F(focal length) = 4.49 mm, Fno = 2.8, FOV = 12.8 deg.

| surface | | Curvature Radius | Thickness | Material | Index | Abbe # | Focal length |
|---|---|---|---|---|---|---|---|
| 0 | object | plane | 700 | | | | |
| 1 | | plane | 0.386 | | | | |
| 2 | stop | plane | −0.386 | | | | |
| 3 | Lens 1 | 0.967 (ASP) | 0.628 | glass | 1.694 | 53.2 | 1.34 |
| 4 | | −11.955 (ASP) | 0.050 | | | | |
| 5 | Lens 2 | 2.521 (ASP) | 0.307 | plastic | 1.636 | 24.0 | −2.21 |
| 6 | | 0.840 (ASP) | 0.433 | | | | |
| 7 | Lens 3 | −0.958 (ASP) | 0.209 | plastic | 1.636 | 24.0 | −0.68 |
| 8 | | 0.798 (ASP) | 0.613 | | | | |
| 9 | Lens 4 | −24.441 (ASP) | 0.561 | plastic | 1.636 | 24.0 | 1.45 |
| 10 | | −0.867 (ASP) | 0.509 | | | | |
| 11 | Image source plane | plane | | | | | |

TABLE 4

Aspheric Coefficients

| surface | 3 | 4 | 5 | 6 |
|---|---|---|---|---|
| K: | −4.7373E−01 | −5.0000E+02 | 1.1269E+01 | −5.4720E+00 |
| A: | 5.8676E−03 | 4.8166E−01 | 4.5659E−01 | 6.1166E−01 |
| B: | 1.5655E−01 | 1.3966E+00 | 2.8239E+00 | 2.3037E+00 |
| C: | 5.8754E−02 | 1.9361E−01 | 1.2858E−01 | −4.2978E+00 |
| D: | 9.8624E−02 | −3.5861E+00 | −6.7087E+00 | 3.7456E+01 |
| E: | | | −3.8747E+00 | 2.2735E+02 |
| F: | | | 4.6024E+01 | −6.9418E+02 |

| surface | 7 | 8 | 9 | 10 |
|---|---|---|---|---|
| K: | 3.5847E+00 | −2.3102E+00 | 1.3624E+02 | −7.7606E−01 |
| A: | −2.0790E+00 | −1.1886E−01 | 1.7513E−02 | −3.3955E−01 |
| B: | 1.2453E+01 | 1.0168E+01 | −7.6911E−01 | 1.3941E+00 |
| C: | −7.0046E+01 | 3.7721E+01 | 4.3536E+00 | −6.4229E+00 |
| D: | 8.4522E+02 | −7.6680E+01 | −6.9622E+00 | 1.5429E+01 |
| E: | −6.9062E+03 | −5.3374E+03 | 8.1794E+00 | −1.7176E+01 |
| F: | 1.3841E+04 | 1.9116E+04 | −7.2187E+00 | 8.9290E+00 |

In the second embodiment, the equation of the aspheric surface profiles of the aforementioned lens elements is the same as the equation of the first embodiment. Also, the definitions of these parameters shown in the following table are the same as those stated in the first embodiment with corresponding values for the second embodiment, so an explanation in this regard will not be provided again.

Moreover, these parameters can be calculated from Table 3 and Table 4 as the following values and satisfy the following conditions:

| Embodiment 2 | | | |
|---|---|---|---|
| f[mm] | 4.49 | f1/f23 | −2.94 |
| Fno | 2.8 | f12/f34 | 0.48 |
| FOV[deg.] | 12.8 | f1/f234 | 0.23 |
| f/f1 | 3.35 | f123/f4 | 4.55 |
| f/f234 | 0.76 | R1/R2 | −0.08 |
| f1/f2 | −0.61 | R3/R4 | 3.00 |
| f2/f3 | 3.25 | R5/R6 | −1.20 |
| f3/f4 | −0.47 | R7/R8 | 28.19 |
| f1/f3 | −1.97 | f/TL | 1.36 |
| f2/f4 | −1.52 | | |

Figure 3A:
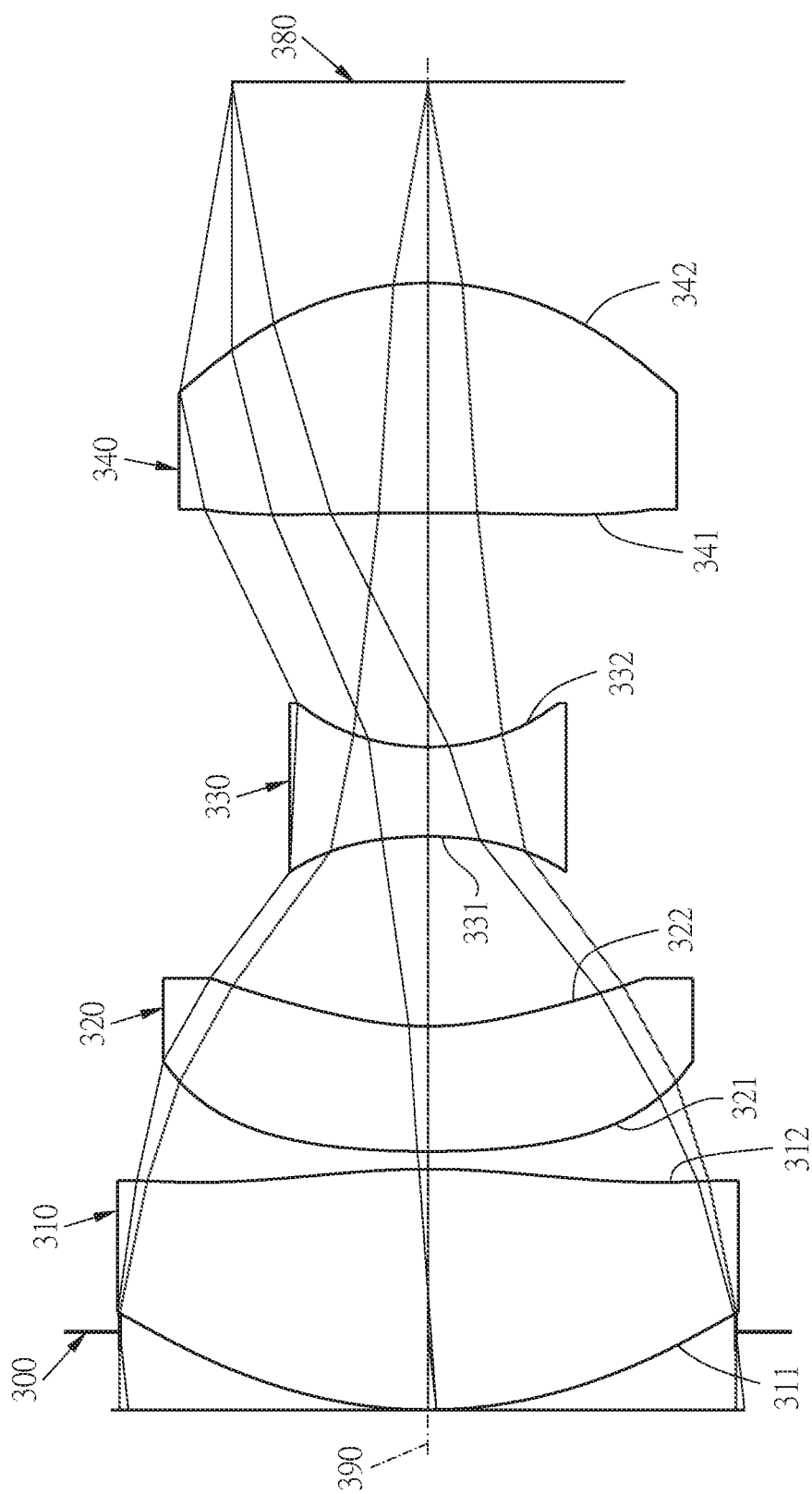
FIG. 3A shows a four-piece infrared single wavelength projection lens system in accordance with a third embodiment of the present invention.
Figure 3B:
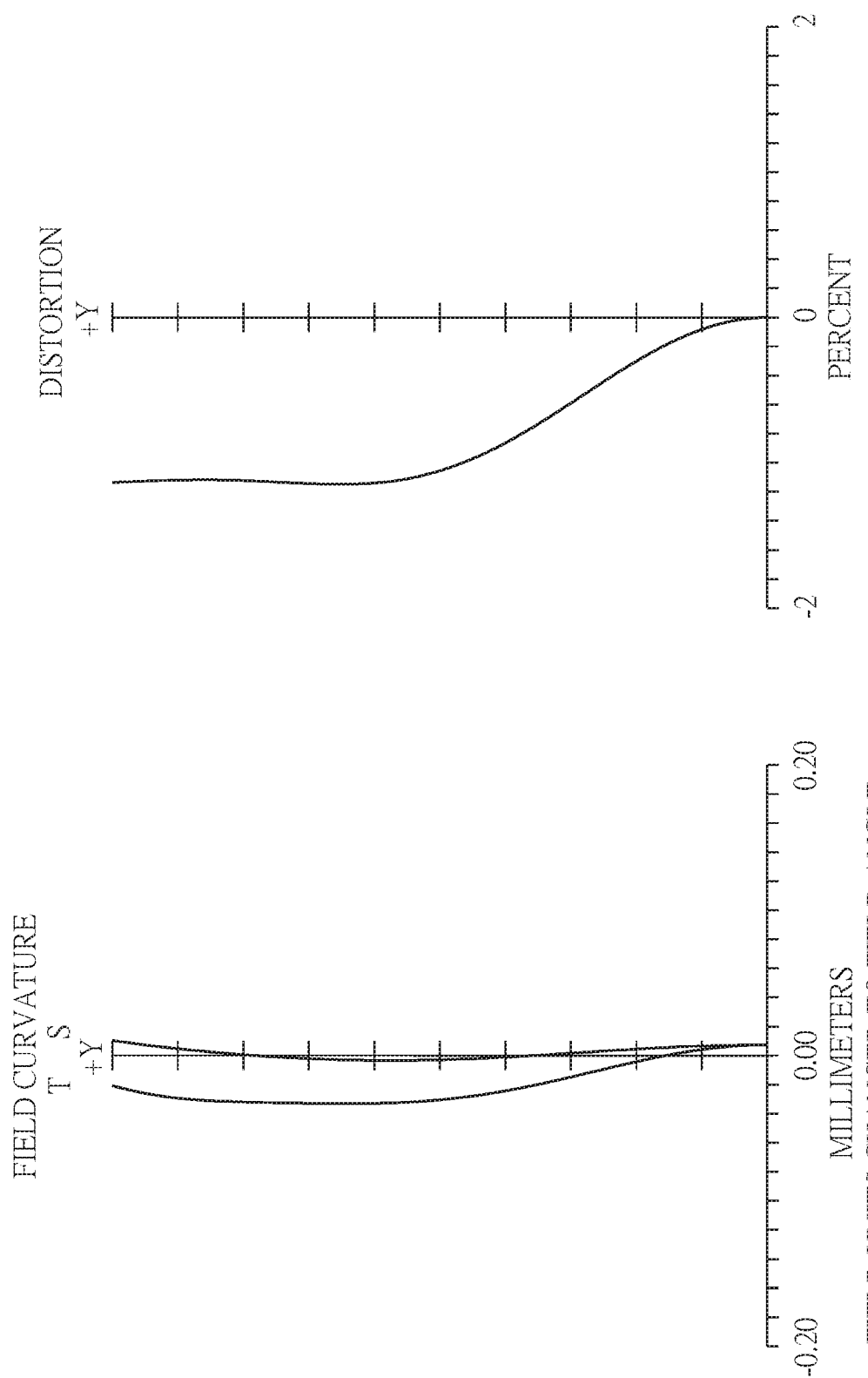
FIG. 3B shows the image plane curve and the distortion curve of the third embodiment of the present invention.

Referring to FIGS. 3A and 3B, FIG. 3A shows a four-piece infrared single wavelength projection lens system in accordance with a third embodiment of the present invention, and FIG. 3B shows, in order from left to right, the image plane curve and the distortion curve of the third embodiment of the present invention. A four-piece infrared single wavelength projection lens system in accordance with the third embodiment of the present invention comprises a stop 300 and a lens group. The lens group comprises, in order from an image side to an image source side: a first lens element 310, a second lens element 320, a third lens element 330, a fourth lens element 340 and an image source plane 380, wherein the four-piece infrared single wavelength projection lens system has a total of four lens elements with refractive power. The stop 300 is disposed between an image-side surface 311 and an image source-side surface 312 of the first lens element 310.

The first lens element 310 with a positive refractive power has the image-side surface 311 being convex near an optical axis 390 and the image source-side surface 312 being convex near the optical axis 390, the image-side surface 311 and the image source-side surface 312 are aspheric, and the first lens element 310 is made of glass.

The second lens element 320 with a negative refractive power has an image-side surface 321 being convex near the optical axis 390 and an image source-side surface 322 being concave near the optical axis 390, the image-side surface 321 and the image source-side surface 322 are aspheric, and the second lens element 320 is made of plastic material.

The third lens element 330 with a negative refractive power has an image-side surface 331 being concave near the optical axis 390 and an image source-side surface 332 being concave near the optical axis 390, the image-side surface 331 and the image source-side surface 332 are aspheric, and the third lens element 330 is made of plastic material.

The fourth lens element 340 with a positive refractive power has an image-side surface 341 being concave near the optical axis 390 and an image source-side surface 342 being convex near the optical axis 390, the image-side surface 341 and the image source-side surface 342 are aspheric, and the fourth lens element 340 is made of plastic material.

The detailed optical data of the third embodiment is shown in table 5, and the aspheric surface data is shown in table 6.

TABLE 5

Embodiment 3
F(focal length) = 4.50 mm, Fno = 2.8, FOV = 12.8 deg.

| surface | | Curvature Radius | Thickness | Material | Index | Abbe # | Focal length |
|---|---|---|---|---|---|---|---|
| 0 | object | plane | 700 | | | | |
| 1 | | plane | 0.195 | | | | |
| 2 | stop | plane | −0.195 | | | | |
| 3 | Lens 1 | 1.240 (ASP) | 0.600 | glass | 1.694 | 53.2 | 1.21 |
| 4 | | −1.989 (ASP) | 0.044 | | | | |
| 5 | Lens 2 | 2.749 (ASP) | 0.312 | plastic | 1.636 | 24.0 | −2.12 |
| 6 | | 0.842 (ASP) | 0.473 | | | | |
| 7 | Lens 3 | −1.101 (ASP) | 0.223 | plastic | 1.636 | 24.0 | −0.60 |
| 8 | | 0.586 (ASP) | 0.583 | | | | |
| 9 | Lens 4 | −8.292 (ASP) | 0.573 | plastic | 1.636 | 24.0 | 1.42 |
| 10 | | −0.804 (ASP) | 0.501 | | | | |
| 11 | Image source plane | plane | | | | | |

TABLE 6

Aspheric Coefficients

| surface | 3 | 4 | 5 | 6 |
|---|---|---|---|---|
| K: | −7.9251E−01 | −4.1582E+01 | 1.2193E+01 | −8.4044E+00 |
| A: | −2.5483E−02 | 2.0448E−01 | 4.0801E−01 | 2.1216E−02 |
| B: | 3.5504E−03 | 5.9631E−03 | −2.8000E−01 | −1.3395E+00 |
| C: | 4.2414E−02 | −1.5132E−01 | 2.1253E+00 | 7.7099E+00 |
| D: | −1.1998E−01 | −4.8274E−03 | −3.8096E+00 | −1.1940E+01 |
| E: | | | 3.9485E+00 | 1.1662E+00 |
| F: | | | 0.0000E+00 | 0.0000E+00 |

| surface | 7 | 8 | 9 | 10 |
|---|---|---|---|---|
| K: | 8.2126E−01 | −1.1612E+01 | 1.4562E+02 | −7.8841E−01 |
| A: | −2.8399E+00 | 6.0132E+00 | 2.8051E−01 | −2.8899E−01 |
| B: | 1.0214E+01 | −4.7873E+01 | −8.9883E−01 | 1.6858E+00 |
| C: | 1.3405E+01 | 6.0287E+02 | 6.3373E+00 | −8.0383E+00 |
| D: | −3.7861E+02 | −4.0165E+03 | −1.2180E+01 | 1.8810E+01 |
| E: | 8.7233E+02 | 8.5908E+03 | 6.7973E+00 | −1.5526E+01 |
| F: | 0.0000E+00 | 0.0000E+00 | 0.0000E+00 | 0.0000E+00 |

In the third embodiment, the equation of the aspheric surface profiles of the aforementioned lens elements is the same as the equation of the first embodiment. Also, the definitions of these parameters shown in the following table are the same as those stated in the first embodiment with corresponding values for the third embodiment, so an explanation in this regard will not be provided again.

Moreover, these parameters can be calculated from Table 5 and Table 6 as the following values and satisfy the following conditions:

Embodiment 3

| f[mm] | 4.50 | f1/f23 | −3.06 |
|---|---|---|---|
| Fno | 2.8 | f12/f34 | 0.39 |
| FOV[deg.] | 12.8 | f1/f234 | 0.17 |
| f/f1 | 3.71 | f123/f4 | 4.63 |
| f/f234 | 0.64 | R1/R2 | −0.62 |
| f1/f2 | −0.57 | R3/R4 | 3.27 |
| f2/f3 | 3.55 | R5/R6 | −1.88 |
| f3/f4 | −0.42 | R7/R8 | 10.32 |
| f1/f3 | −2.04 | f/TL | 1.36 |
| f2/f4 | −1.50 | | |

Figure 4A:
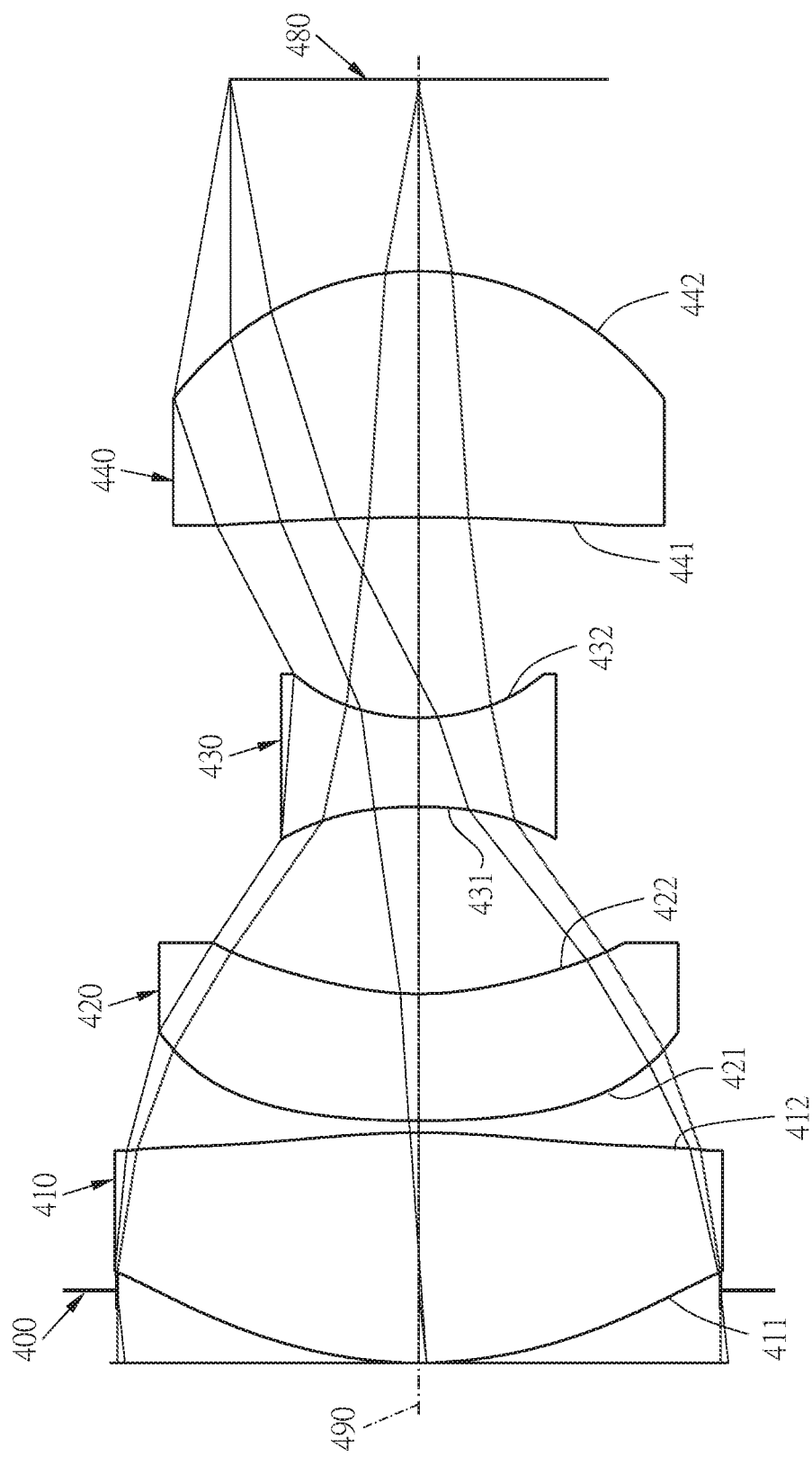
FIG. 4A shows a four-piece infrared single wavelength projection lens system in accordance with a fourth embodiment of the present invention.
Figure 4B:
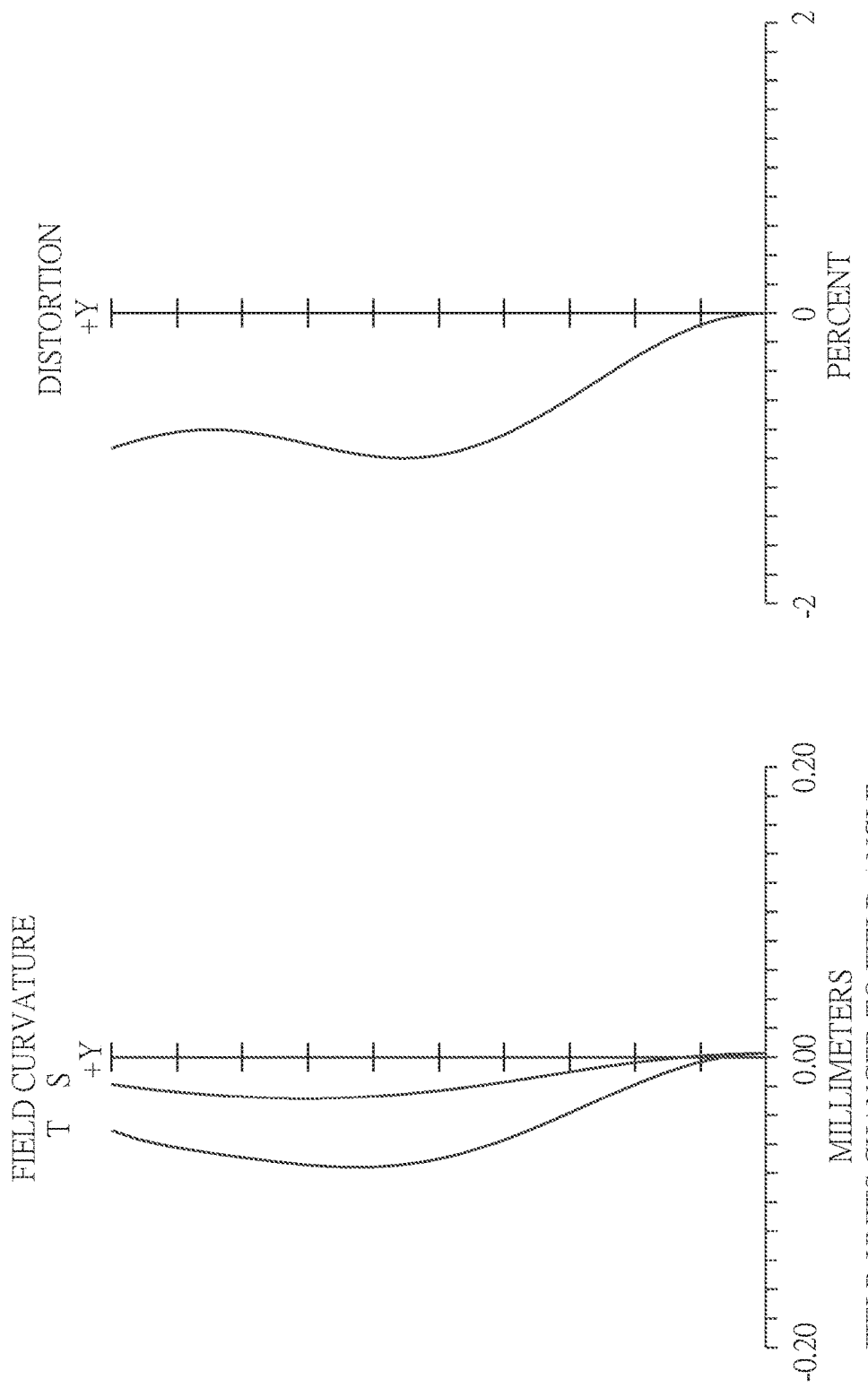
FIG. 4B shows the image plane curve and the distortion curve of the fourth embodiment of the present invention.

Referring to FIGS. 4A and 4B, FIG. 4A shows a four-piece infrared single wavelength projection lens system in accordance with a fourth embodiment of the present invention, and FIG. 4B shows, in order from left to right, the image plane curve and the distortion curve of the fourth embodiment of the present invention. A four-piece infrared single wavelength projection lens system in accordance with the fourth embodiment of the present invention comprises a stop 400 and a lens group. The lens group comprises, in order from an image side to an image source side: a first lens element 410, a second lens element 420, a third lens element 430, a fourth lens element 440 and an image source plane 480, wherein the four-piece infrared single wavelength projection lens system has a total of four lens elements with refractive power. The stop 400 is disposed between an image-side surface 411 and an image source-side surface 412 of the first lens element 410.

The first lens element 410 with a positive refractive power has the image-side surface 411 being convex near an optical axis 490 and the image source-side surface 412 being convex near the optical axis 490, the image-side surface 411 and the image source-side surface 412 are aspheric, and the first lens element 410 is made of glass.

The second lens element 420 with a negative refractive power has an image-side surface 421 being convex near the optical axis 490 and an image source-side surface 422 being concave near the optical axis 490, the image-side surface 421 and the image source-side surface 422 are aspheric, and the second lens element 420 is made of plastic material.

The third lens element 430 with a negative refractive power has an image-side surface 431 being concave near the optical axis 490 and an image source-side surface 432 being concave near the optical axis 490, the image-side surface 431 and the image source-side surface 432 are aspheric, and the third lens element 430 is made of plastic material.

The fourth lens element 440 with a positive refractive power has an image-side surface 441 being concave near the optical axis 490 and an image source-side surface 442 being convex near the optical axis 490, the image-side surface 441 and the image source-side surface 442 are aspheric, and the fourth lens element 440 is made of plastic material.

The detailed optical data of the fourth embodiment is shown in table 7, and the aspheric surface data is shown in table 8.

TABLE 7

Embodiment 4
F(focal length) = 4.50 mm, Fno = 2.8, FOV = 12.8 deg.

| surface | | Curvature Radius | Thickness | Material | Index | Abbe # | Focal length |
|---|---|---|---|---|---|---|---|
| 0 | object | plane | 700 | | | | |
| 1 | | plane | 0.188 | | | | |
| 2 | stop | plane | −0.188 | | | | |
| 3 | Lens 1 | 1.250 (ASP) | 0.598 | glass | 1.694 | 53.2 | 1.24 |
| 4 | | −2.107 (ASP) | 0.031 | | | | |
| 5 | Lens 2 | 2.738 (ASP) | 0.330 | plastic | 1.636 | 24.0 | −2.28 |
| 6 | | 0.881 (ASP) | 0.487 | | | | |
| 7 | Lens 3 | −1.123 (ASP) | 0.231 | plastic | 1.636 | 24.0 | −0.59 |
| 8 | | 0.575 (ASP) | 0.520 | | | | |
| 9 | Lens 4 | −5.860 (ASP) | 0.640 | plastic | 1.636 | 24.0 | 1.39 |
| 10 | | −0.774 (ASP) | 0.499 | | | | |
| 11 | Image source plane | plane | | | | | |

TABLE 8

Aspheric Coefficients

| surface | 3 | 4 | 5 | 6 |
|---|---|---|---|---|
| K: | −8.8505E−01 | −4.2960E+01 | 1.1819E+01 | −8.3987E+00 |
| A: | −3.1652E−02 | 1.9349E−01 | 3.9062E−01 | 9.4515E−02 |
| B: | 2.8551E−03 | −4.6447E−02 | −3.3693E−01 | −1.0861E+00 |
| C: | 4.3129E−02 | −2.3073E−01 | 2.1257E+00 | 8.0517E+00 |
| D: | −1.8161E−01 | 3.1149E−02 | −3.8528E+00 | −1.1576E+01 |
| E: | | | 3.7060E+00 | 2.3601E+00 |
| F: | | | 0.0000E+00 | 0.0000E+00 |

| surface | 7 | 8 | 9 | 10 |
|---|---|---|---|---|
| K: | −3.5142E+00 | −1.4382E+01 | 4.8232E+01 | −6.0709E−01 |
| A: | −2.7674E+00 | 6.7752E+00 | 1.6746E−01 | −2.1341E−01 |
| B: | 1.1256E+01 | −5.4368E+01 | −1.2985E+00 | 1.5185E+00 |
| C: | 2.6507E+01 | 6.7506E+02 | 6.6627E+00 | −8.3326E+00 |
| D: | −5.3141E+02 | −4.3912E+03 | −1.2881E+01 | 1.7484E+01 |
| E: | 1.3214E+03 | 1.1235E+04 | 6.2733E+00 | −1.4008E+01 |
| F: | 5.1795E+02 | −9.1903E+03 | 0.0000E+00 | 0.0000E+00 |

In the fourth embodiment, the equation of the aspheric surface profiles of the aforementioned lens elements is the same as the equation of the first embodiment. Also, the definitions of these parameters shown in the following table are the same as those stated in the first embodiment with corresponding values for the fourth embodiment, so an explanation in this regard will not be provided again.

Moreover, these parameters can be calculated from Table 7 and Table 8 as the following values and satisfy the following conditions:

Embodiment 4

| f[mm] | 4.50 | f1/f23 | −3.08 |
|---|---|---|---|
| Fno | 2.8 | f12/f34 | 0.426 |
| FOV[deg.] | 12.8 | f1/f234 | 0.216 |
| f/f1 | 3.62 | f123/f4 | 4.60 |
| f/f234 | 0.78 | R1/R2 | −0.59 |
| f1/f2 | −0.55 | R3/R4 | 3.11 |
| f2/f3 | 3.85 | R5/R6 | −1.95 |
| f3/f4 | −0.43 | R7/R8 | 7.57 |
| f1/f3 | −2.10 | f/TL | 1.35 |
| f2/f4 | −1.64 | | |

Figure 5A:
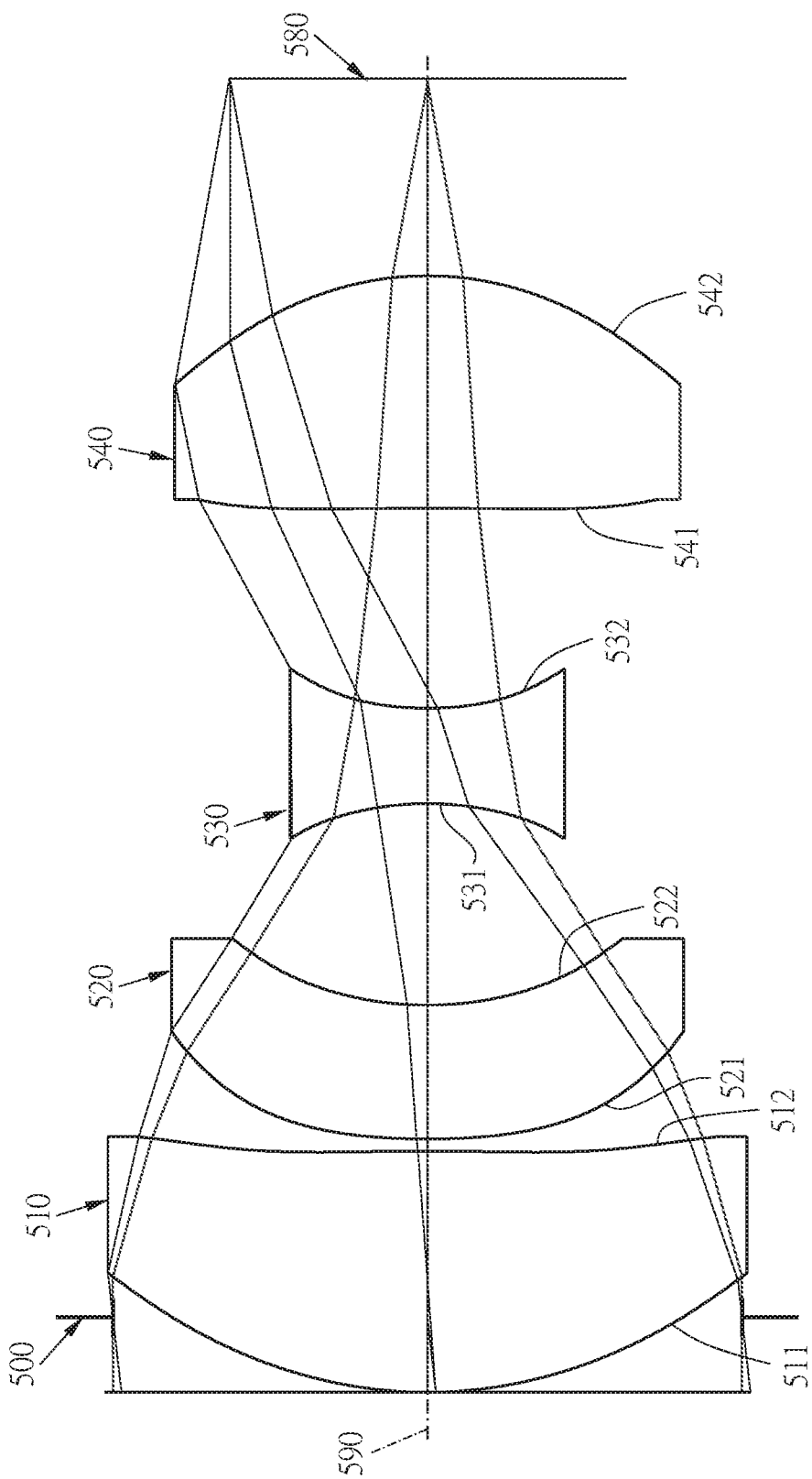
FIG. 5A shows a four-piece infrared single wavelength projection lens system in accordance with a fifth embodiment of the present invention.
Figure 5B:
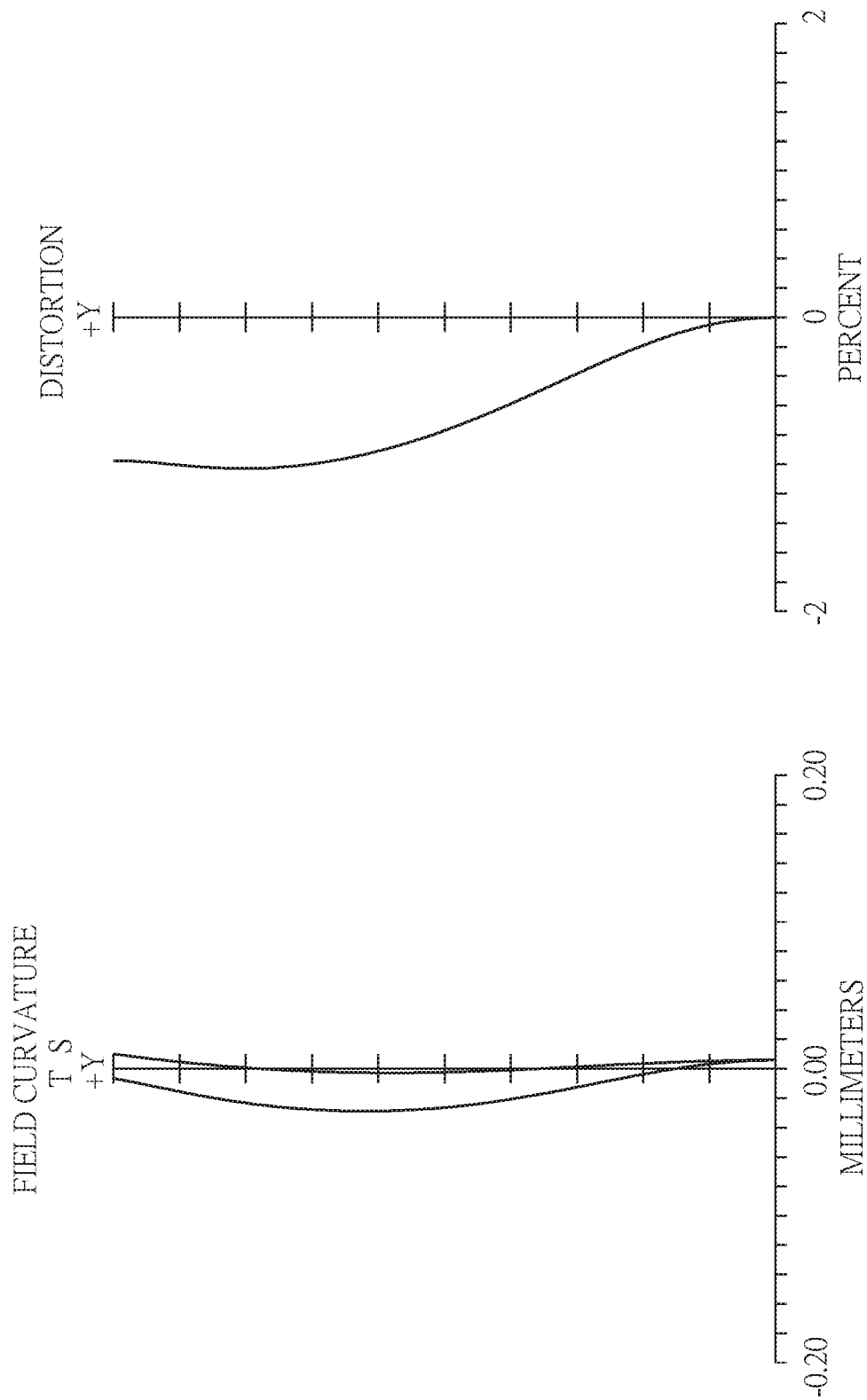
FIG. 5B shows the image plane curve and the distortion curve of the fifth embodiment of the present invention.

Referring to FIGS. 5A and 5B, FIG. 5A shows a four-piece infrared single wavelength projection lens system in accordance with a fifth embodiment of the present invention, and FIG. 5B shows, in order from left to right, the image plane curve and the distortion curve of the fifth embodiment of the present invention. A four-piece infrared single wavelength projection lens system in accordance with the fifth embodiment of the present invention comprises a stop 500 and a lens group. The lens group comprises, in order from an image side to an image source side: a first lens element 510, a second lens element 520, a third lens element 530, a fourth lens element 540 and an image source plane 580, wherein the four-piece infrared single wavelength projection lens system has a total of four lens elements with refractive power. The stop 500 is disposed between an image-side surface 511 and an image source-side surface 512 of the first lens element 510.

The first lens element 510 with a positive refractive power has the image-side surface 511 being convex near an optical axis 590 and the image source-side surface 512 being convex near the optical axis 590, the image-side surface 511 and the image source-side surface 512 are aspheric, and the first lens element 510 is made of glass.

The second lens element 520 with a negative refractive power has an image-side surface 521 being convex near the optical axis 590 and an image source-side surface 522 being concave near the optical axis 590, the image-side surface 521 and the image source-side surface 522 are aspheric, and the second lens element 520 is made of plastic material.

The third lens element 530 with a negative refractive power has an image-side surface 531 being concave near the optical axis 590 and an image source-side surface 532 being concave near the optical axis 590, the image-side surface 531 and the image source-side surface 532 are aspheric, and the third lens element 530 is made of plastic material.

The fourth lens element 540 with a positive refractive power has an image-side surface 541 being concave near the optical axis 590 and an image source-side surface 542 being convex near the optical axis 590, the image-side surface 541 and the image source-side surface 542 are aspheric, and the fourth lens element 540 is made of plastic material.

The detailed optical data of the fifth embodiment is shown in table 9, and the aspheric surface data is shown in table 10.

TABLE 9

Embodiment 5
F(focal length) = 4.50 mm, Fno = 2.8, FOV = 12.8 deg.

| surface | | Curvature Radius | Thickness | Material | Index | Abbe # | Focal length |
|---|---|---|---|---|---|---|---|
| 0 | object | plane | 700 | | | | |
| 1 | | plane | 0.190 | | | | |
| 2 | stop | plane | −0.190 | | | | |
| 3 | Lens 1 | 1.124 (ASP) | 0.612 | glass | 1.694 | 53.2 | 1.46 |
| 4 | | −6.653 (ASP) | 0.030 | | | | |
| 5 | Lens 2 | 1.829 (ASP) | 0.340 | plastic | 1.636 | 24.0 | −3.15 |
| 6 | | 0.872 (ASP) | 0.519 | | | | |
| 7 | Lens 3 | −0.766 (ASP) | 0.242 | plastic | 1.636 | 24.0 | −0.62 |
| 8 | | 0.849 (ASP) | 0.507 | | | | |
| 9 | Lens 4 | −9.601 (ASP) | 0.589 | plastic | 1.636 | 24.0 | 1.39 |
| 10 | | −0.799 (ASP) | 0.500 | | | | |
| 11 | Image source plane | plane | | | | | |

TABLE 10

Aspheric Coefficients

| surface | 3 | 4 | 5 | 6 |
|---|---|---|---|---|
| K: | −7.3231E−01 | −3.1367E+02 | 4.8351E+00 | −1.7929E+00 |
| A: | −2.8178E−02 | 4.0302E−01 | 7.0662E−01 | 3.8759E−01 |
| B: | 8.6830E−02 | −3.4625E−02 | −9.1470E−02 | 8.7775E−01 |
| C: | 1.2417E−02 | −1.0493E+00 | 9.5686E−01 | 3.4398E+00 |
| D: | −1.1679E−01 | 8.4764E−01 | −4.9062E+00 | −5.5696E+00 |
| E: | | | 8.4796E+00 | 2.7203E+01 |
| F: | | | −3.5847E+00 | −2.4278E+02 |

| surface | 7 | 8 | 9 | 10 |
|---|---|---|---|---|
| K: | −1.3315E+01 | −2.4165E+01 | 2.0744E+02 | 1.4062E−01 |
| A: | −2.7020E+00 | 7.1283E+00 | 4.3902E−01 | 7.9338E−02 |
| B: | 9.8176E+00 | −5.8923E+01 | −1.2085E+00 | 7.8301E−01 |
| C: | −1.9463E+01 | 6.0752E+02 | 6.9948E+00 | −3.6234E+00 |
| D: | −1.2174E+03 | −4.4472E+03 | −1.5207E+01 | 1.6465E+01 |
| E: | 1.2145E+04 | 1.5956E+04 | 1.1010E+01 | −3.1451E+01 |
| F: | −4.2901E+04 | −2.3773E+04 | 3.3157E+00 | 2.8647E+01 |

In the fifth embodiment, the equation of the aspheric surface profiles of the aforementioned lens elements is the same as the equation of the first embodiment. Also, the definitions of these parameters shown in the following table are the same as those stated in the first embodiment with corresponding values for the fifth embodiment, so an explanation in this regard will not be provided again.

Moreover, these parameters can be calculated from Table 9 and Table 10 as the following values and satisfy the following conditions:

Embodiment 5

| | | | |
|---|---|---|---|
| f[mm] | 4.50 | f1/f23 | −3.08 |
| Fno | 2.8 | f12/f34 | 0.43 |
| FOV[deg.] | 12.8 | f1/f234 | 0.25 |
| f/f1 | 3.08 | f123/f4 | 4.77 |
| f/f234 | 0.75 | R1/R2 | −0.17 |
| f1/f2 | −0.46 | R3/R4 | 2.10 |
| f2/f3 | 5.06 | R5/R6 | −0.90 |
| f3/f4 | −0.45 | R7/R8 | 12.01 |
| f1/f3 | −2.35 | f/TL | 1.35 |
| f2/f4 | −2.27 | | |

Figure 6A:
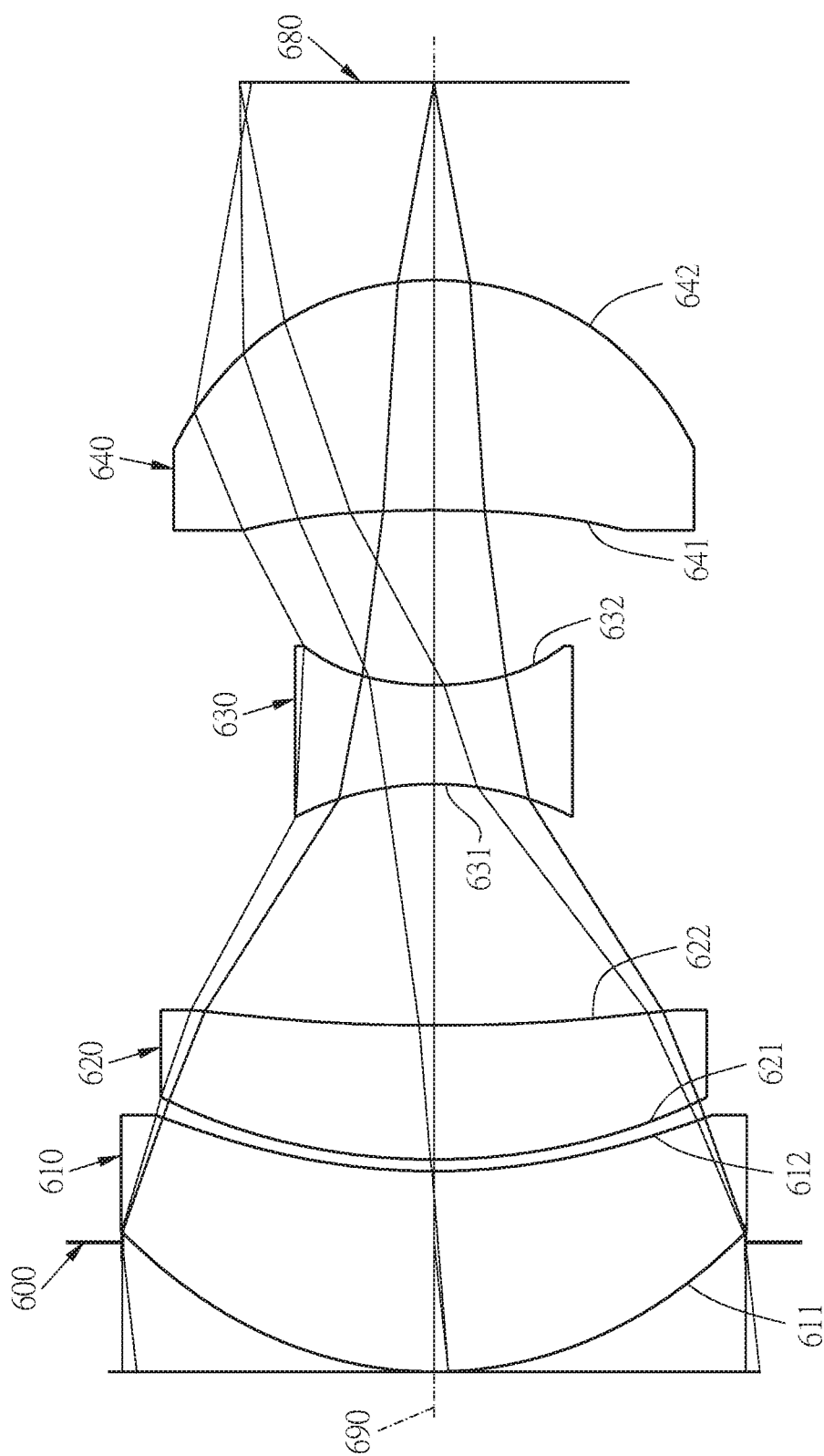
FIG. 6A shows a four-piece infrared single wavelength projection lens system in accordance with a sixth embodiment of the present invention.
Figure 6B:
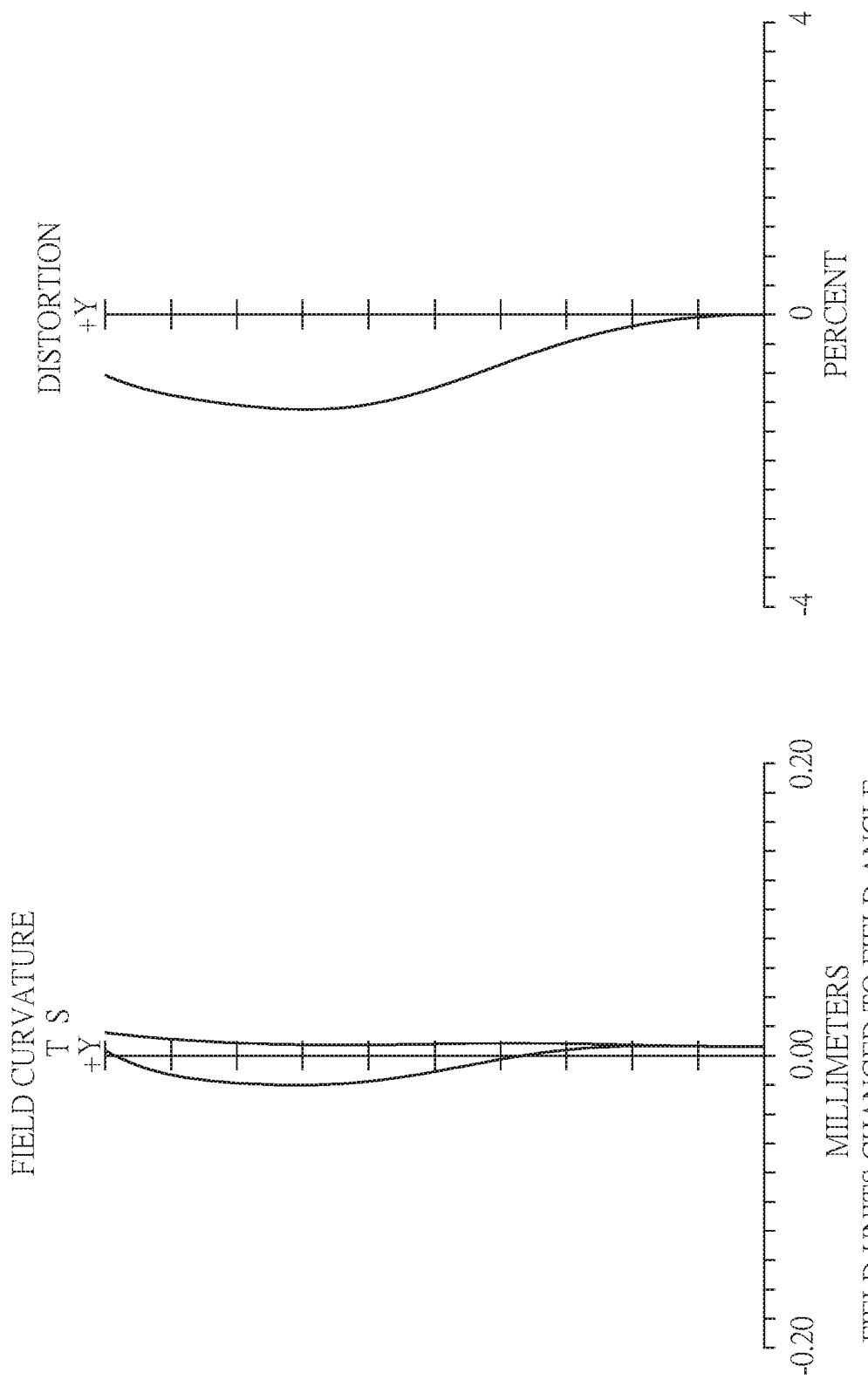
FIG. 6B shows the image plane curve and the distortion curve of the sixth embodiment of the present invention

Referring to FIGS. 6A and 6B, FIG. 6A shows a four-piece infrared single wavelength projection lens system in accordance with a sixth embodiment of the present invention, and FIG. 6B shows, in order from left to right, the image plane curve and the distortion curve of the sixth embodiment of the present invention. A four-piece infrared single wavelength projection lens system in accordance with the sixth embodiment of the present invention comprises a stop 600 and a lens group. The lens group comprises, in order from an image side to an image source side: a first lens element 610, a second lens element 620, a third lens element 630, a fourth lens element 640 and an image source plane 680, wherein the four-piece infrared single wavelength projection lens system has a total of four lens elements with refractive power. The stop 600 is disposed between an image-side surface 611 and an image source-side surface 612 of the first lens element 610.

The first lens element 610 with a positive refractive power has the image-side surface 611 being convex near an optical axis 690 and the image source-side surface 612 being concave near the optical axis 690, the image-side surface 611 and the image source-side surface 612 are aspheric, and the first lens element 610 is made of glass.

The second lens element 620 with a positive refractive power has an image-side surface 621 being convex near the optical axis 690 and an image source-side surface 622 being concave near the optical axis 690, the image-side surface 621 and the image source-side surface 622 are aspheric, and the second lens element 620 is made of plastic material.

The third lens element 630 with a negative refractive power has an image-side surface 631 being concave near the optical axis 690 and an image source-side surface 632 being concave near the optical axis 690, the image-side surface 631 and the image source-side surface 632 are aspheric, and the third lens element 630 is made of plastic material.

The fourth lens element 640 with a positive refractive power has an image-side surface 641 being concave near the optical axis 690 and an image source-side surface 642 being convex near the optical axis 690, the image-side surface 641 and the image source-side surface 642 are aspheric, and the fourth lens element 640 is made of plastic material.

The detailed optical data of the sixth embodiment is shown in table 11, and the aspheric surface data is shown in table 12.

TABLE 11

Embodiment 6
F(focal length) = 4.50 mm, Fno = 2.8, FOV = 12.8 deg.

| surface | | Curvature Radius | Thickness | Material | Index | Abbe # | Focal length |
|---|---|---|---|---|---|---|---|
| 0 | object | plane | 700 | | | | |
| 1 | | plane | 0.335 | | | | |
| 2 | stop | plane | −0.335 | | | | |
| 3 | Lens 1 | 1.010 (ASP) | 0.518 | glass | 1.694 | 53.2 | 2.76 |
| 4 | | 1.733 (ASP) | 0.030 | | | | |
| 5 | Lens 2 | 1.663 (ASP) | 0.346 | plastic | 1.636 | 24.0 | 3.96 |
| 6 | | 4.872 (ASP) | 0.623 | | | | |
| 7 | Lens 3 | −0.760 (ASP) | 0.256 | plastic | 1.636 | 24.0 | −0.61 |
| 8 | | 0.821 (ASP) | 0.451 | | | | |
| 9 | Lens 4 | −3.535 (ASP) | 0.593 | plastic | 1.636 | 24.0 | 1.51 |
| 10 | | −0.780 (ASP) | 0.510 | | | | |
| 11 | Image source plane | plane | | | | | |

TABLE 12

Aspheric Coefficients

| surface | 3 | 4 | 5 | 6 |
|---|---|---|---|---|
| K: | −3.0751E−01 | −8.2747E−01 | −1.6824E−02 | −7.0384E+01 |
| A: | −1.0014E−03 | 6.0922E−03 | 1.8296E−02 | 7.5911E−02 |
| B: | 4.1447E−02 | 1.9652E−01 | 6.6535E−02 | 4.6670E−01 |
| C: | −1.3627E−01 | −3.2552E+00 | −1.3207E+00 | −2.9461E+00 |
| D: | −1.6963E−01 | 1.7963E+01 | 9.5068E+00 | 4.4903E−01 |
| E: | 1.3831E+00 | −4.8798E+01 | −3.3256E+01 | 3.4056E+01 |
| F: | −2.3696E+00 | 6.5069E+01 | 5.7424E+01 | −9.2660E+01 |
| G: | 1.2103E+00 | −3.4413E+01 | −3.8750E+01 | 7.3346E+01 |

| surface | 7 | 8 | 9 | 10 |
|---|---|---|---|---|
| K: | −1.1416E+01 | 1.9567E+00 | −1.0000E+02 | −7.1146E−01 |
| A: | −1.3078E+00 | 3.6756E+00 | −3.4264E−01 | −4.7921E−01 |
| B: | −4.4991E+01 | −1.3521E+02 | −5.1362E+00 | −1.5559E+00 |
| C: | 1.6637E+03 | 4.7624E+03 | 5.4073E+01 | 2.1561E+01 |
| D: | −2.9956E+04 | −9.4572E+04 | −2.8842E+02 | −1.2944E+02 |
| E: | 2.9324E+05 | 1.0461E+06 | 8.9236E+02 | 3.8732E+02 |
| F: | −1.4833E+06 | −5.9625E+06 | −1.4346E+03 | −5.8604E+02 |
| G: | 3.0207E+06 | 1.3534E+07 | 9.1668E+02 | 3.4941E+02 |

In the sixth embodiment, the equation of the aspheric surface profiles of the aforementioned lens elements is the same as the equation of the first embodiment. Also, the definitions of these parameters shown in the following table are the same as those stated in the first embodiment with corresponding values for the sixth embodiment, so an explanation in this regard will not be provided again.

Moreover, these parameters can be calculated from Table 11 and Table 12 as the following values and satisfy the following conditions:

Embodiment 6

| f[mm] | 4.50 | f1/f23 | −2.69 |
|---|---|---|---|
| Fno | 2.8 | f12/f34 | 0.12 |
| FOV[deg.] | 12.8 | f1/f234 | 0.39 |
| f/f1 | 1.63 | f123/f4 | 4.03 |
| f/f234 | 0.64 | R1/R2 | 0.58 |
| f1/f2 | 0.70 | R3/R4 | 0.34 |
| f2/f3 | −6.53 | R5/R6 | −0.93 |
| f3/f4 | −0.40 | R7/R8 | 4.53 |
| f1/f3 | −4.54 | f/TL | 1.35 |
| f2/f4 | 2.62 | | |

Figure 7A:
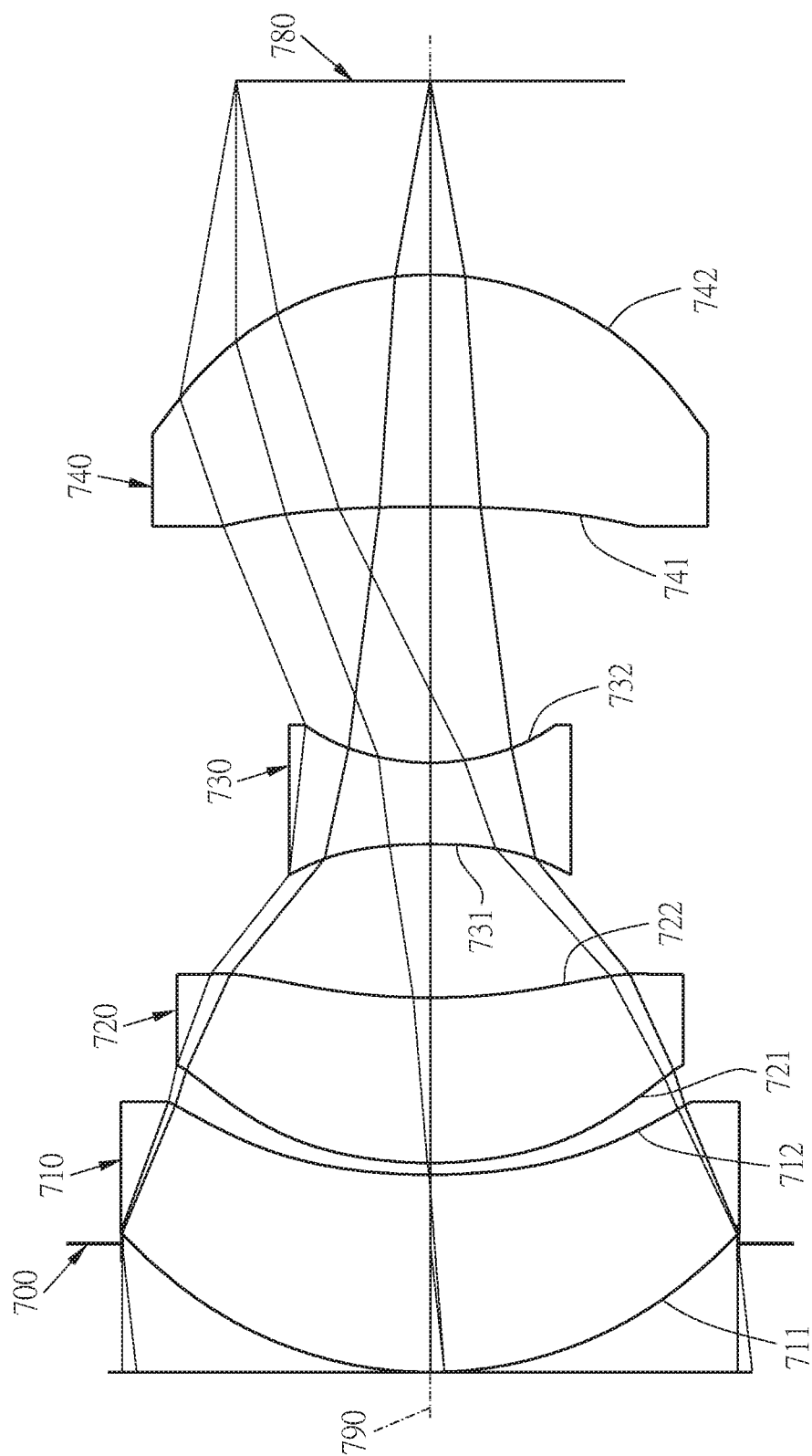
FIG. 7A shows a four-piece infrared single wavelength projection lens system in accordance with a seventh embodiment of the present invention.

Referring to FIGS. 7A and 7B, FIG. 7A shows a four-piece infrared single wavelength projection lens system in accordance with a seventh embodiment of the present invention, and FIG. 7B shows, in order from left to right, the image plane curve and the distortion curve of the seventh embodiment of the present invention. A four-piece infrared single wavelength projection lens system in accordance with the seventh embodiment of the present invention comprises a stop 700 and a lens group. The lens group comprises, in order from an image side to an image source side: a first lens element 710, a second lens element 720, a third lens element 730, a fourth lens element 740 and an image source plane 780, wherein the four-piece infrared single wavelength projection lens system has a total of four lens elements with refractive power. The stop 700 is disposed between an image-side surface 711 and an image source-side surface 712 of the first lens element 710.

The first lens element 710 with a positive refractive power has the image-side surface 711 being convex near an optical axis 790 and the image source-side surface 712 being concave near the optical axis 790, the image-side surface 711 and the image source-side surface 712 are aspheric, and the first lens element 710 is made of glass.

The second lens element 720 with a positive refractive power has an image-side surface 721 being convex near the optical axis 790 and an image source-side surface 722 being concave near the optical axis 790, the image-side surface 721 and the image source-side surface 722 are aspheric, and the second lens element 720 is made of plastic material.

The third lens element 730 with a negative refractive power has an image-side surface 731 being concave near the optical axis 790 and an image source-side surface 732 being concave near the optical axis 790, the image-side surface 731 and the image source-side surface 732 are aspheric, and the third lens element 730 is made of plastic material.

The fourth lens element 740 with a positive refractive power has an image-side surface 741 being concave near the optical axis 790 and an image source-side surface 742 being convex near the optical axis 790, the image-side surface 741 and the image source-side surface 742 are aspheric, and the fourth lens element 740 is made of plastic material.

The detailed optical data of the sixth embodiment is shown in table 13, and the aspheric surface data is shown in table 14.

TABLE 13

Embodiment 7
F(focal length) = 4.50 mm, Fno = 2.8, FOV = 12.8 deg.

| surface | | Curvature Radius | Thickness | Material | Index | Abbe # | Focal length |
|---|---|---|---|---|---|---|---|
| 0 | object | plane | 700 | | | | |
| 1 | | plane | 0.332 | | | | |
| 2 | stop | plane | −0.332 | | | | |
| 3 | Lens 1 | 1.043 (ASP) | 0.510 | glass | 1.806 | 40.7 | 2.64 |
| 4 | | 1.645 (ASP) | 0.030 | | | | |
| 5 | Lens 2 | 1.130 (ASP) | 0.426 | plastic | 1.643 | 22.5 | 4.52 |
| 6 | | 1.622 (ASP) | 0.397 | | | | |
| 7 | Lens 3 | −1.440 (ASP) | 0.210 | plastic | 1.643 | 22.5 | −0.65 |
| 8 | | 0.594 (ASP) | 0.661 | | | | |
| 9 | Lens 4 | −5.063 (ASP) | 0.599 | plastic | 1.643 | 22.5 | 1.60 |
| 10 | | −0.864 (ASP) | 0.500 | | | | |
| 11 | Image source plane | plane | | | | | |

TABLE 14

Aspheric Coefficients

| surface | 3 | 4 | 5 | 6 |
|---|---|---|---|---|
| K: | −2.7729E−01 | 2.4374E+00 | 1.1828E+00 | −1.6507E+00 |
| A: | −1.0414E−03 | −1.3611E−01 | −9.1367E−02 | 3.7484E−01 |
| B: | 3.2010E−01 | 5.9758E+00 | 6.2869E+00 | −2.8300E+00 |
| C: | −1.4933E+00 | −4.1173E+01 | −4.3354E+01 | 2.8304E+01 |
| D: | 4.1256E+00 | 1.5852E+02 | 1.7423E+02 | −2.1032E+02 |
| E: | −5.8878E+00 | −3.6446E+02 | −4.4130E+02 | 7.4854E+02 |
| F: | 3.8611E+00 | 4.4588E+02 | 6.0397E+02 | −1.3477E+03 |
| G: | −9.0185E−01 | −2.2155E+02 | −3.5008E+02 | 1.0012E+03 |

| surface | 7 | 8 | 9 | 10 |
|---|---|---|---|---|
| K: | −8.2237E−01 | −4.0388E−02 | 5.5397E+01 | −5.4694E−01 |
| A: | −2.5237E+00 | −3.3472E−02 | −3.0948E+00 | −6.0601E−01 |
| B: | 1.1430E+01 | −2.5227E+01 | 9.6788E−01 | 2.9079E+00 |
| C: | −3.1643E+02 | 5.6137E+02 | −1.3468E+00 | −1.1846E+01 |
| D: | 5.2875E+03 | −3.7369E+03 | −2.0481E+01 | 1.9638E+01 |
| E: | −4.3403E+04 | 4.8016E+03 | 8.4776E+01 | 7.4823E+00 |
| F: | 1.7398E+05 | 3.8535E+04 | −5.9395E+01 | −7.5740E+01 |
| G: | −2.6073E+05 | 4.8372E+04 | −3.5374E+01 | 7.7935E+01 |

In the seventh embodiment, the equation of the aspheric surface profiles of the aforementioned lens elements is the same as the equation of the first embodiment. Also, the definitions of these parameters shown in the following table are the same as those stated in the first embodiment with corresponding values for the seventh embodiment, so an explanation in this regard will not be provided again.

Moreover, these parameters can be calculated from Table 13 and Table 14 as the following values and satisfy the following conditions:

| Embodiment 7 | | | |
|---|---|---|---|
| f[mm] | 4.50 | f1/f23 | −2.44 |
| Fno | 2.8 | f12/f34 | 0.29 |
| FOV[deg.] | 12.8 | f1/f234 | 0.51 |
| f/f1 | 1.71 | f123/f4 | 3.78 |
| f/f234 | 0.87 | R1/R2 | 0.63 |
| f1/f2 | 0.58 | R3/R4 | 0.70 |
| f2/f3 | −6.92 | R5/R6 | −2.43 |
| f3/f4 | −0.41 | R7/R8 | 5.86 |
| f1/f3 | −4.04 | f/TL | 1.35 |
| f2/f4 | 2.83 | | |

In the present four-piece infrared single wavelength projection lens system, the lens elements can be made of plastic or glass. If the lens elements are made of plastic, the cost will be effectively reduced. If the lens elements are made of glass, there is more freedom in distributing the refractive power of the four-piece infrared single wavelength projection lens system and the overall effect of ambient temperature on the lens elements can be reduced. Plastic lens elements can have aspheric surfaces, which allow more design parameter freedom (than spherical surfaces), so as to reduce the aberration and the number of the lens elements, as well as the total track length of the four-piece infrared single wavelength projection lens system.

In the present four-piece infrared single wavelength projection lens system, if the image-side or the image source-side surface of the lens elements with refractive power is convex and the location of the convex surface is not defined, the image-side or the image source-side surface of the lens elements near the optical axis is convex. If the image-side or the image source-side surface of the lens elements is concave and the location of the concave surface is not defined, the image-side or the image source-side surface of the lens elements near the optical axis is concave.

The four-piece infrared single wavelength projection lens system of the present invention can be used in focusing optical systems and can obtain better image quality. The four-piece infrared single wavelength projection lens system of the present invention can also be used in electronic imaging systems, such as, 3D image capturing, digital camera, mobile device, digital flat panel or vehicle camera.

While we have shown and described various embodiments in accordance with the present invention, it should be clear to those skilled in the art that further embodiments may be made without departing from the scope of the present invention.

What is claimed is:

1. A four-piece infrared single wavelength projection lens system, in order from an image side to an image source side, comprising:

a stop;

a first lens element with a positive refractive power, having an image-side surface being convex near an optical axis, at least one of the image-side surface and an image source-side surface of the first lens element being aspheric, the first lens element being made of glass;

a second lens element with a refractive power, having an image-side surface being convex near the optical axis and an image source-side surface being concave near the optical axis, at least one of the image-side surface and the image source-side surface of the second lens element being aspheric;

a third lens element with a negative refractive power, having an image-side surface being concave near the optical axis and an image source-side surface being concave near the optical axis, at least one of the image-side surface and the image source-side surface of the third lens element being aspheric; and a fourth lens element with a positive refractive power, having an image-side surface being concave near the optical axis and an image source-side surface being convex near the optical axis, at least one of the image-side surface and the image source-side surface of the fourth lens element being aspheric;

wherein a focal length of the first lens element is f1, a focal length of the third lens element is f3, and they satisfy the relation: −4.9<f1/f3<−1.6.

2. The four-piece infrared single wavelength projection lens system as claimed in claim 1, wherein a focal length of the four-piece infrared single wavelength projection lens system is f, the focal length of the first lens element is f1, and they satisfy the relation: 1.0<f/f1<4.0.

3. The four-piece infrared single wavelength projection lens system as claimed in claim 1, wherein a focal length of the four-piece infrared single wavelength projection lens system is f, a focal length of the second lens element, the third lens element and the fourth lens element combined is f234, and they satisfy the relation: 0.35<f/f234<1.2.

4. The four-piece infrared single wavelength projection lens system as claimed in claim 1, wherein the focal length of the first lens element is f1, a focal length of the second lens element is f2, and they satisfy the relation: −0.81<f1/f2<1.1.

5. The four-piece infrared single wavelength projection lens system as claimed in claim 1, wherein a focal length of the second lens element is f2, the focal length of the third lens element is f3, and they satisfy the relation: −72.3<f2/f3<5.6.

6. The four-piece infrared single wavelength projection lens system as claimed in claim 1, wherein the focal length of the third lens element is f3, a focal length of the fourth lens element is f4, and they satisfy the relation: −0.67<f3/f4<−0.20.

7. The four-piece infrared single wavelength projection lens system as claimed in claim 1, wherein a focal length of the second lens element is f2, a focal length of the fourth lens element is f4, and they satisfy the relation: −2.5<f2/f4<29.8.

8. The four-piece infrared single wavelength projection lens system as claimed in claim 1, wherein the focal length of the first lens element is f1, a focal length of the second lens element and the third lens element combined is f23, and they satisfy the relation: −4.1<f1/f23<−1.4.

9. The four-piece infrared single wavelength projection lens system as claimed in claim 1, wherein a focal length of the first lens element and the second lens element combined is f12, a focal length of the third lens element and the fourth lens element combined is f34, and they satisfy the relation: 0.05<f12/f34<0.79.

10. The four-piece infrared single wavelength projection lens system as claimed in claim 1, wherein the focal length of the first lens element is f1, a focal length of the second lens element, the third lens element and the fourth lens element combined is f234, and they satisfy the relation: 0.07<f1/f234<0.62.

11. The four-piece infrared single wavelength projection lens system as claimed in claim 1, wherein a focal length of the first lens element, the second lens element and the third lens element combined is f123, a focal length of the fourth lens element is f4, and they satisfy the relation: 2.8<f123/f4<5.3.

12. The four-piece infrared single wavelength projection lens system as claimed in claim 1, wherein a radius of curvature of the image-side surface of the first lens element is R1, a radius of curvature of the image source-side surface of the first lens element is R2, and they satisfy the relation: −0.9<R1/R2<0.9.

13. The four-piece infrared single wavelength projection lens system as claimed in claim 1, wherein a radius of curvature of the image-side surface of the second lens element is R3, a radius of curvature of the image source-side surface of the second lens element is R4, and they satisfy the relation: 0.1<R3/R4<3.6.

14. The four-piece infrared single wavelength projection lens system as claimed in claim 1, wherein a radius of curvature of the image-side surface of the third lens element is R5, a radius of curvature of the image source-side surface of the third lens element is R6, and they satisfy the relation: −3.9<R5/R6<−0.6.

15. The four-piece infrared single wavelength projection lens system as claimed in claim 1, wherein a radius of curvature of the image-side surface of the fourth lens element is R7, a radius of curvature of the image source-side surface of the fourth lens element is R8, and they satisfy the relation: 3.5<R7/R8<29.2.

16. The four-piece infrared single wavelength projection lens system as claimed in claim 1, wherein a focal length of the four-piece infrared single wavelength projection lens system is f, a distance from the image-side surface of the first lens element to the image source-side surface along the optical axis is TL, and they satisfy the relation: 1.0<f/TL<1.67.

17. The four-piece infrared single wavelength projection lens system as claimed in claim 1, wherein a refractive index of the first lens element is n1, a refractive index of the second lens element is n2, a refractive index of the third lens element is n3, a refractive index of the fourth lens element is n4, and they satisfy the relations: n1>1.6, n2>1.6, n3>1.6 and n4>1.6.

* * * * *